United States Patent
Zhang et al.

(10) Patent No.: US 12,471,084 B2
(45) Date of Patent: Nov. 11, 2025

(54) TERMINAL AND METHOD FOR RECEIVING UNICAST PHYSICAL DOWNLINK SHARED CHANNEL (PDSCH) OR MULTICAST PDSCH

(71) Applicant: Samsung Electronics Co., Ltd., Gyeonggi-do (KR)

(72) Inventors: Sa Zhang, Beijing (CN); Feifei Sun, Beijing (CN)

(73) Assignee: Samsung Electronics Co., Ltd., Seoul (KR)

( * ) Notice: Subject to any disclaimer, the term of this patent is extended or adjusted under 35 U.S.C. 154(b) by 389 days.

(21) Appl. No.: 18/090,830

(22) Filed: Dec. 29, 2022

(65) Prior Publication Data

US 2023/0217437 A1    Jul. 6, 2023

(30) Foreign Application Priority Data

Dec. 31, 2021 (CN) ......................... 202111665385.X
Apr. 24, 2022 (CN) ......................... 202210435608.1

(51) Int. Cl.
*H04W 72/1273* (2023.01)
*H04L 1/1812* (2023.01)
*H04W 72/11* (2023.01)

(52) U.S. Cl.
CPC ....... *H04W 72/1273* (2013.01); *H04L 1/1812* (2013.01); *H04W 72/11* (2023.01)

(58) Field of Classification Search
CPC . H04W 72/1273; H04W 72/11; H04W 72/21; H04W 72/0446; H04L 1/1812; H04L 1/1854; H04L 1/1671; H04L 1/1861; H04L 1/1864; H04L 1/1887; H04L 5/0055; H04L 5/0094; H04L 5/1469; Y02D 30/70
See application file for complete search history.

(56) References Cited

U.S. PATENT DOCUMENTS

| | | | |
|---|---|---|---|
| 2020/0267597 A1 | 8/2020 | Huang et al. | |
| 2023/0135551 A1* | 5/2023 | Gao | H04L 1/1812 370/329 |
| 2023/0155744 A1* | 5/2023 | Bae | H04L 1/1864 370/280 |
| 2023/0164761 A1* | 5/2023 | Gerami | H04W 72/23 370/329 |
| 2023/0189298 A1* | 6/2023 | Lee | H04W 72/30 |

(Continued)

OTHER PUBLICATIONS

WO 2021194301 A1 (Year: 2021).*

(Continued)

*Primary Examiner* — Rushil P. Sampat
(74) *Attorney, Agent, or Firm* — The Farrell Law Firm, P.C.

(57) ABSTRACT

A terminal and a method performed by the same in a wireless communication system are provided for improved communication efficiency. The method includes receiving at least one PDSCH from one or more scheduled PDSCHs. Each of the one or more PDSCHs includes a unicast PDSCH including a dynamically scheduled unicast PDSCH and/or a unicast semi-persistent scheduling PDSCH, and/or a multicast PDSCH including a dynamically scheduled multicast PDSCH and/or a multicast SPS PDSCH, and feeding back hybrid automatic repeat request-acknowledgement information for the at least one received PDSCH.

12 Claims, 15 Drawing Sheets

(56) References Cited

U.S. PATENT DOCUMENTS

2024/0032013 A1* 1/2024 Kumagai .......... H04W 72/1273
2024/0080858 A1* 3/2024 Yuan ..................... H04L 1/1812
2024/0187142 A1* 6/2024 Lei ........................ H04L 5/0055

OTHER PUBLICATIONS

WO 2022205296 A1 (Year: 2022).*
Moderator (CMCC), Summary#2 on Mechanisms to Support Group Scheduling for RRC_CONNECTED UEs for NR MBS, R1-2112540, 3GPP TSG RAN WG1 #107-e, Nov. 11-19, 2021, 118 pages.
LG Electronics Inc., "Mechanisms to Improve Reliability of Broadcast/Multicast Service", R1-2109984, 3GPP TSG RAN WG1 Meeting #106bis-e, Oct. 11-19, 2021, 13 pages.
Moderator (Huawei) "FL Summary#3 on Improving Reliability for MBS for RRC_CONNECTED UEs", R1-2112591, 3GPP TSG RAN WG1 #107-e, Nov. 11-19, 2021, 79 pages.
Qualcomm Incorporated, "View on Group Scheduling for Multicast RRC_CONNECTED UEs", R1-2112239, 3GPP TSG RAN WG1 #107-e, Nov. 11-19, 2021, 8 pages.
International Search Report dated Mar. 27, 2023 issued in counterpart application No. PCT/KR2022/021582, 8 pages.

* cited by examiner

FIG. 7A

| row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

FIG. 7B

| row index | $\{K_0, S, L\}$ set |
|---|---|
| 1 | $\{0, 0, 7\}, \{1, 2, 7\}, \{2, 4, 4\}$ |
| 2 | $\{1, 3, 4\}, \{3, 5, 7\}$ |
| 3 | $\{0, 0, 7\}, \{3, 7, 7\}$ |

Receive at least one PDSCH from one or more scheduled PDSCHs, wherein each of the one or more PDSCHs includes a unicast PDSCH including a dynamically scheduled unicast PDSCH and/or a unicast PDSCH and/or a unicast SPS PDSCH, and/or a multicast PDSCH including a dynamically scheduled multicast PDSCH and/or a multicast SPS PDSCH ～S810

Feed back HARQ-ACK information for the at least one received PDSCH ～S820

TERMINAL AND METHOD FOR RECEIVING UNICAST PHYSICAL DOWNLINK SHARED CHANNEL (PDSCH) OR MULTICAST PDSCH

CROSS-REFERENCE TO RELATED APPLICATION(S)

This application is based on and claims priority under 35 U.S.C. § 119(a) to Chinese Patent Application Nos. 202111665385.X and 202210435608.1, which were filed in the China National Intellectual Property Administration on Dec. 31, 2021, and Apr. 24, 2022, respectively, the entire disclosure of each which is incorporated herein by reference.

BACKGROUND

1. Field

The disclosure relates generally to wireless communication and, more particularly, to a terminal and a method thereof for performing hybrid automatic repeat request (HARD) feedback in a wireless communication system.

2. Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure has been made to address at least the above-mentioned problems and/or disadvantages and to provide at least the advantages described below.

An aspect of the disclosure provides a method performed by a terminal in a wireless communication system, the method including receiving at least one physical downlink data channel (PDSCH) from one or more scheduled PDSCHs and feeding back, e.g., transmitting or reporting, HARQ-acknowledgement (HARQ-ACK) information for the at least one received PDSCH. Each of the one or more PDSCHs includes at least one of a unicast PDSCH or a multicast PDSCH, the unicast PDSCH includes a dynamically scheduled unicast PDSCH or a unicast semi-persistent scheduling (SPS) PDSCH, and the multicast PDSCH includes a dynamically scheduled multicast PDSCH or a multicast SPS PDSCH.

Another aspect of the disclosure provides a terminal in a wireless communication system that includes a transceiver configured to transmit and receive signals, and a controller coupled to the transceiver and configured to receive at least one PDSCH from one or more scheduled PDSCHs and feed back HARQ-ACK information for the at least one received PDSCH, with each of the one or more PDSCHs including at least one of a unicast PDSCH or a multicast PDSCH, the unicast PDSCH including a dynamically scheduled unicast PDSCH or a unicast SPS PDSCH, and the multicast PDSCH including a dynamically scheduled multicast PDSCH or a multicast SPS PDSCH.

BRIEF DESCRIPTION

The above and other aspects, features, and advantages of certain embodiments will be more apparent from the following description taken in conjunction with the accompanying drawings, in which:

FIGS. 7A and 7B illustrate time domain resource allocation (TDRA) tables according to embodiments;

FIG. 8 is a flowchart illustrating a method performed by a terminal according to an embodiment;

DETAILED DESCRIPTION

Figure 1:
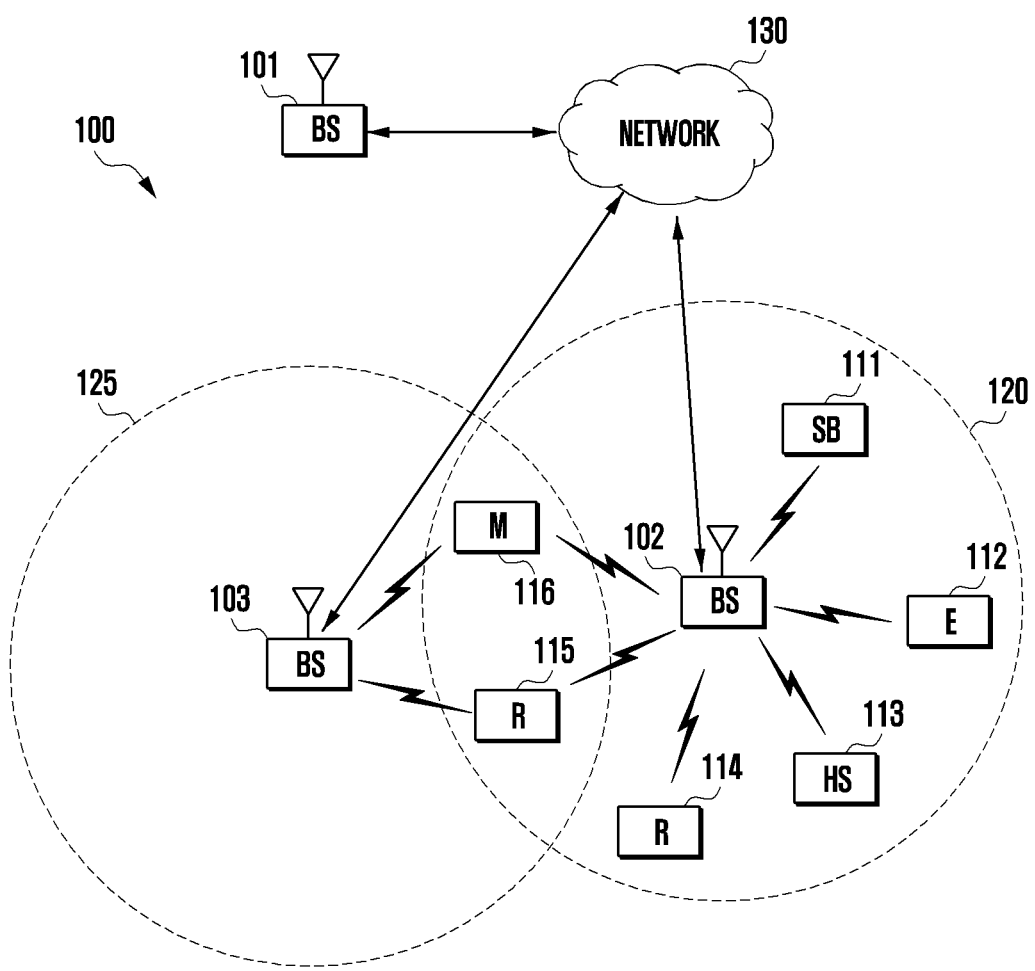
FIG. 1 illustrates a wireless network according to an embodiment.

Hereinafter, embodiments will be described more fully with reference to the accompanying drawings. In the accompanying drawings, like reference numerals may denote like elements. Also, detailed descriptions of well-known functions and configurations in the art may be omitted when it is deemed that they may unnecessarily obscure the essence of the disclosure.

When embodiments are described herein, descriptions of techniques which are well known in the technical field to which the disclosure pertains and are not directly related to the disclosure will be omitted. This is to clearly convey the concept of the disclosure by omitting descriptions of unnecessary details.

In the drawings, some elements may be exaggerated, omitted, or roughly illustrated. Also, size of each element does not exactly correspond to an actual size of each element. In the drawings, elements that are the same or are in correspondence may be identified with the same or similar reference numerals. Herein, the term couple and its derivatives refer to any direct or indirect communication between two or more elements, whether or not those elements are in physical contact with one another. The terms transmit, receive, and communicate, as well as derivatives thereof, encompass both direct and indirect communication. The terms include and comprise, as well as derivatives thereof, mean inclusion without limitation. The term or is inclusive, meaning and/or, unless contrary to the context of use. The phrase associated with, as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term controller means any device, system or part thereof that controls at least one operation. Such a controller can be implemented in hardware or a combination of hardware and software and/or firmware. The functionality associated with any particular controller can be centralized or distributed, whether locally or remotely.

The phrase at least one of, when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, at least one of: A, B, or C includes any of the following combinations: A, B, C, A and B, A and C, B and C, and A, B and C.

Moreover, various functions described below can be implemented or supported by one or more computer programs, each of which is formed from computer-readable program code and embodied in a computer-readable medium.

The terms application and program refer to one or more computer programs, software components, sets of instructions, procedures, functions, objects, classes, instances, related data, or a portion thereof adapted for implementation in a suitable computer-readable program code. The phrase computer-readable program code includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory. A non-transitory computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Unless otherwise defined, technical terms or scientific terms used in the disclosure shall have the ordinary meaning understood by those with ordinary skills in the art.

It should be understood that first, second and similar words used in the disclosure do not express any order, quantity or importance, but are only used to distinguish different components. Similar words such as singular forms a, an or the do not express a limitation of quantity, but express the existence of at least one of the referenced item, unless the context clearly dictates otherwise. For example, reference to a component surface includes reference to one or more of such surfaces.

As used herein, any reference to an example or example, an implementation or implementation, or an embodiment or embodiment means that particular elements, features, structures or characteristics described in connection with the embodiment is included in at least one embodiment. The phrases in one embodiment or in one example appearing in different places do not necessarily refer to the same embodiment.

As used herein, a portion of something means at least some of that thing, and as such may mean less than all of, or all of, the thing. As such, a portion of a thing includes the entire thing as a special case, i.e., the entire thing is an example of a portion of the thing.

As used herein, the term set means one or more. Accordingly, a set of items can be a single item or a collection of two or more items.

To determine whether a specific condition is satisfied or fulfilled, expressions, such as greater than or less than are used by way of example and expressions, such as greater than or equal to or less than or equal to are also applicable and not excluded. For example, a condition defined with greater than or equal to may be replaced by greater than (or vice-versa), a condition defined with less than or equal to may be replaced by less than (or vice-versa), etc.

Words such as include or comprise indicate that elements or objects appearing before the word encompass the listed elements or objects appearing after the word and their equivalents, but other elements or objects are not excluded. Words such as connect or connected are not limited to physical or mechanical connection, but can include electrical connection, whether direct or indirect. Upper, lower, left and right are only used to express a relative positional relationship, and when an absolute position of the described object changes, the relative positional relationship may change accordingly.

The embodiments discussed below are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to LTE and/or 5G communication systems, those skilled in the art will understand that the main points of the disclosure can also be applied to other communication systems with similar technical backgrounds and channel formats with slight modifications without departing from the scope of the disclosure. The technical schemes of the embodiments of the present application can be applied to various communication systems, and for example, the communication systems may include global systems for mobile communications (GSM), code division multiple access (CDMA) systems, wideband CDMA (WCDMA) systems, general packet radio service (GPRS) systems, LTE systems, LTE frequency division duplex (FDD) systems, LTE time division duplex (TDD) systems, universal mobile telecommunications system (UMTS), worldwide interoperability for microwave access (WiMAX) communication systems, 5G systems or new radio (NR) systems, etc. In addition, the technical schemes of the embodiments can be applied to future-oriented communication technologies. In addition, the technical schemes of the embodiments can be applied to future-oriented communication technologies.

FIG. 1 to FIG. 3B describe embodiments implemented using orthogonal frequency division multiplexing (OFDM) or orthogonal frequency division multiple access (OFDMA) communication technologies in wireless communication systems. However, the disclosure is not limited to these particular technologies, and different embodiments may be implemented in other suitably arranged communication systems.

FIG. 1 illustrates a wireless network 100 according to an embodiment.

Referring to FIG. 1, the wireless network 100 includes a gNodeB (gNB) 101, a gNB 102, and a gNB 103. gNB 101 communicates with gNB 102 and gNB 103. gNB 101 also communicates with at least one Internet protocol (IP) network 130, such as the Internet, a private IP network, or other data networks.

Depending on a type of the network, other well-known terms such as base station (BS) or access point (AP) can be used instead of gNodeB or gNB. For convenience, the terms gNodeB and gNB are used to refer to network infrastructure components that provide wireless access for remote terminals. Depending on the type of the network, other well-known terms such as mobile station, user station, remote terminal, wireless terminal or user apparatus can be used instead of user equipment or UE. For example, the terms terminal, user equipment and UE may be used to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of UEs within a coverage area 120 of gNB 102. The first of the plurality of UEs include UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M), such as a cellular phone, a wireless laptop computer, a wireless personal digital assistant (PDA), etc. The gNB 103 provides wireless broadband access to network 130 for a second plurality of UEs within a coverage area 125 of gNB 103. The second plurality of UEs include a UE 115 and a UE 116. The one or more of gNBs 101-103 can communicate with each other and with UEs 111-116 using 5G, (LTE, LTE-A, WiMAX or other advanced wireless communication technologies.

The dashed lines in FIG. 1 illustrate approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

One or more of gNB 101, gNB 102, and gNB 103 may include a two dimensional (2D) antenna array. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Further, gNB 101 can directly communicate with any number of UEs and provide wireless broadband access to the network 130 for those UEs. Similarly, each or gNB 102 and gNB 103 can directly communicate with the network 130 and provide direct wireless broadband access to the network 130 for the UEs. In addition, gNB 101, gNB 102 and/or gNB 103 can provide access to other or additional external networks, such as external telephone networks or other types of data networks.

Figure 2A:
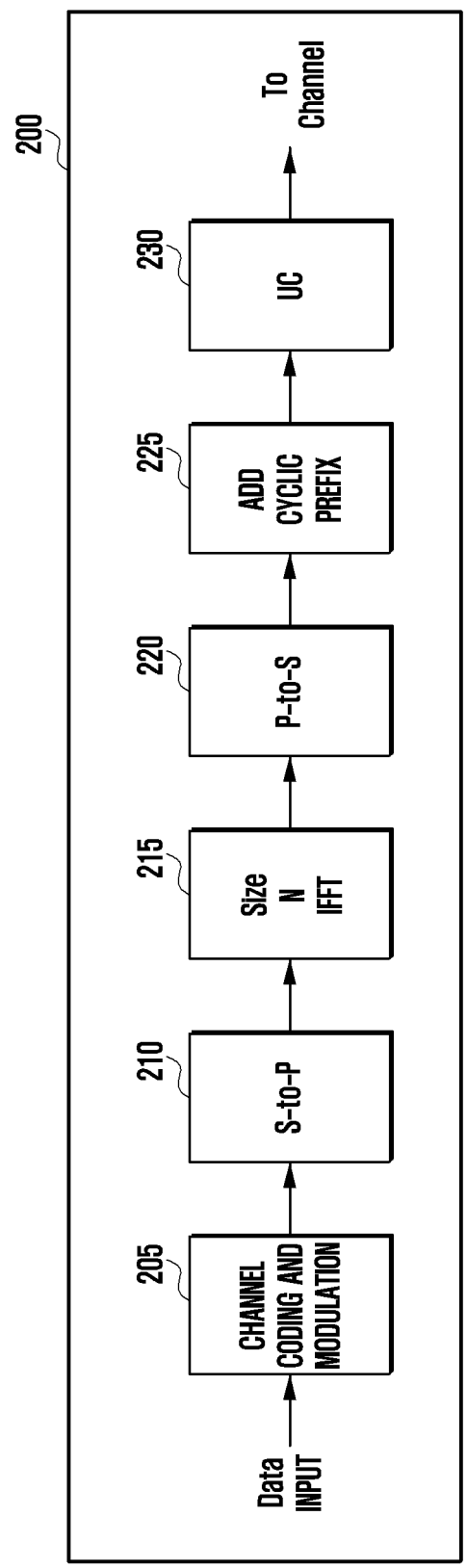
FIGS. 2A and 2B illustrate wireless transmission and reception paths according to an embodiment.
Figure 2B:
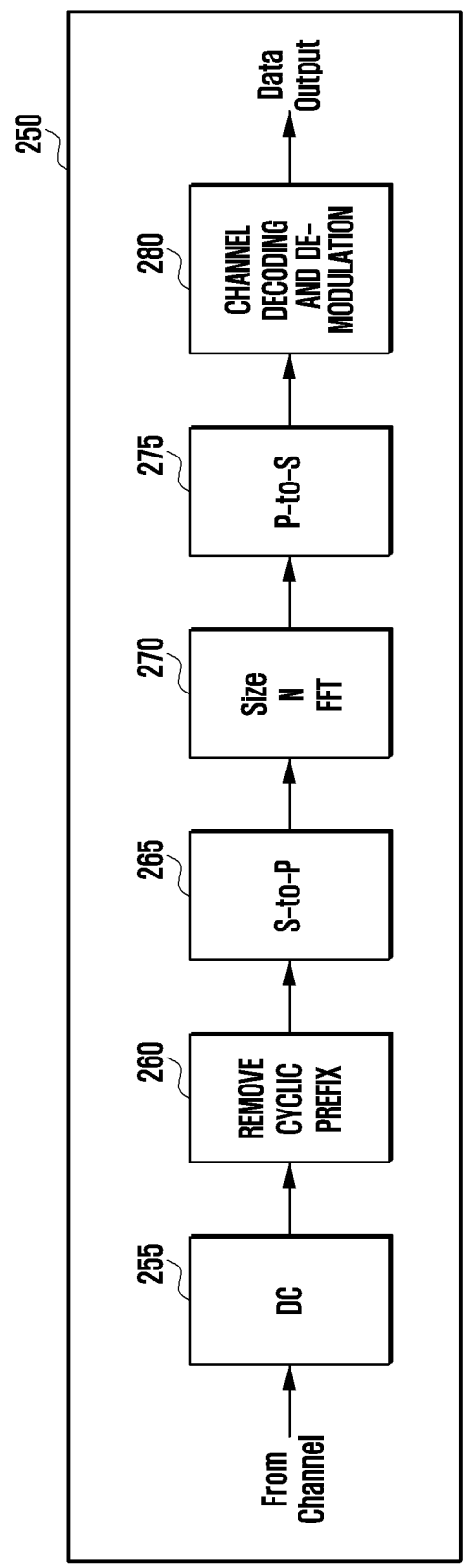

FIGS. 2A and 2B illustrate example wireless transmission and reception paths according to an embodiment. Regarding FIGS. 2A and 2B, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or QAM) to generate a sequence of frequency-domain modulated symbols. The S-to-P block 210 converts (e.g., demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The P-to-S block 220 converts (e.g., multiplexes) parallel time domain output symbols from the size N IFFT block 215 to generate a serial time domain signal. The cyclic prefix addition block 225 inserts a cyclic prefix into the time domain signal. The UC 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time domain baseband signal. The serial-to-parallel block 265 converts the time domain baseband signal into a parallel time domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Further, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Further, FIGS. 2A and 2B are intended to illustrate examples of types of transmission and reception paths that can be used in a wireless network. Any other suitable architecture can be used to support wireless communication in a wireless network.

Figure 3A:
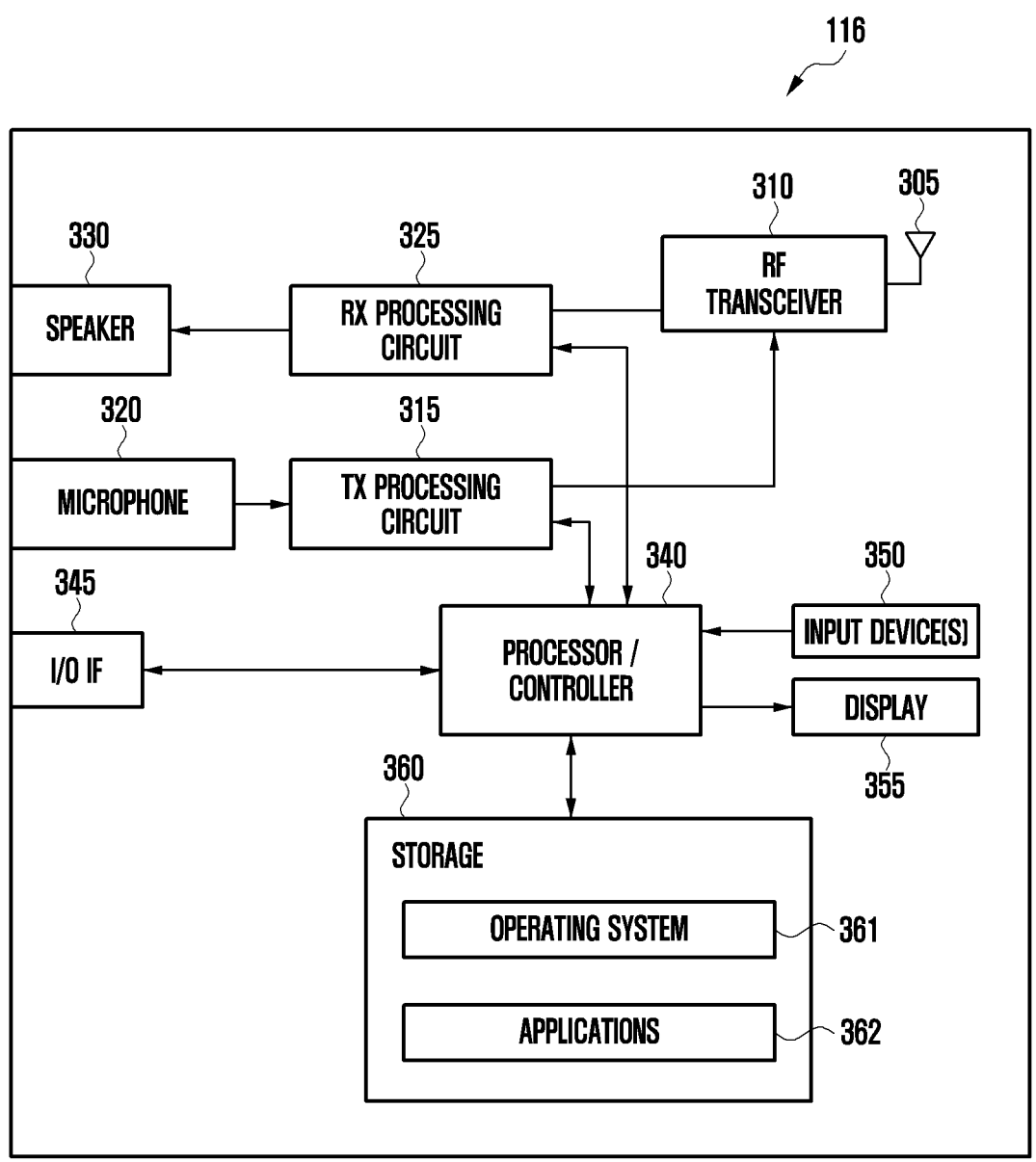
FIG. 3A illustrates a user equipment (UE) according to an embodiment.

FIG. 3A illustrates an example UE 116 according to an embodiment. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, one of more input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for Internet browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute the OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices, such as laptop computers and handheld computers. I/O interface 345 is a communication path between these accessories and the processor/controller 340.

The processor/controller 340 is also coupled to the one or more input device(s) 350 and the display 355. An operator of UE 116 can input data into UE 116 using the one or more input device(s) 350. The display 355 may be a liquid crystal display or other display capable of presenting text and/or at least limited graphics (such as from a website). The memory 360 is coupled to the processor/controller 340. A part of the memory 360 can include a RAM, while another part of the memory 360 can include a flash memory or other ROM.

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Further, although FIG. 3A illustrates that the UE 116 is configured as a mobile phone or a smart phone, UEs can be configured to operate as other types of mobile or fixed devices.

Figure 3B:
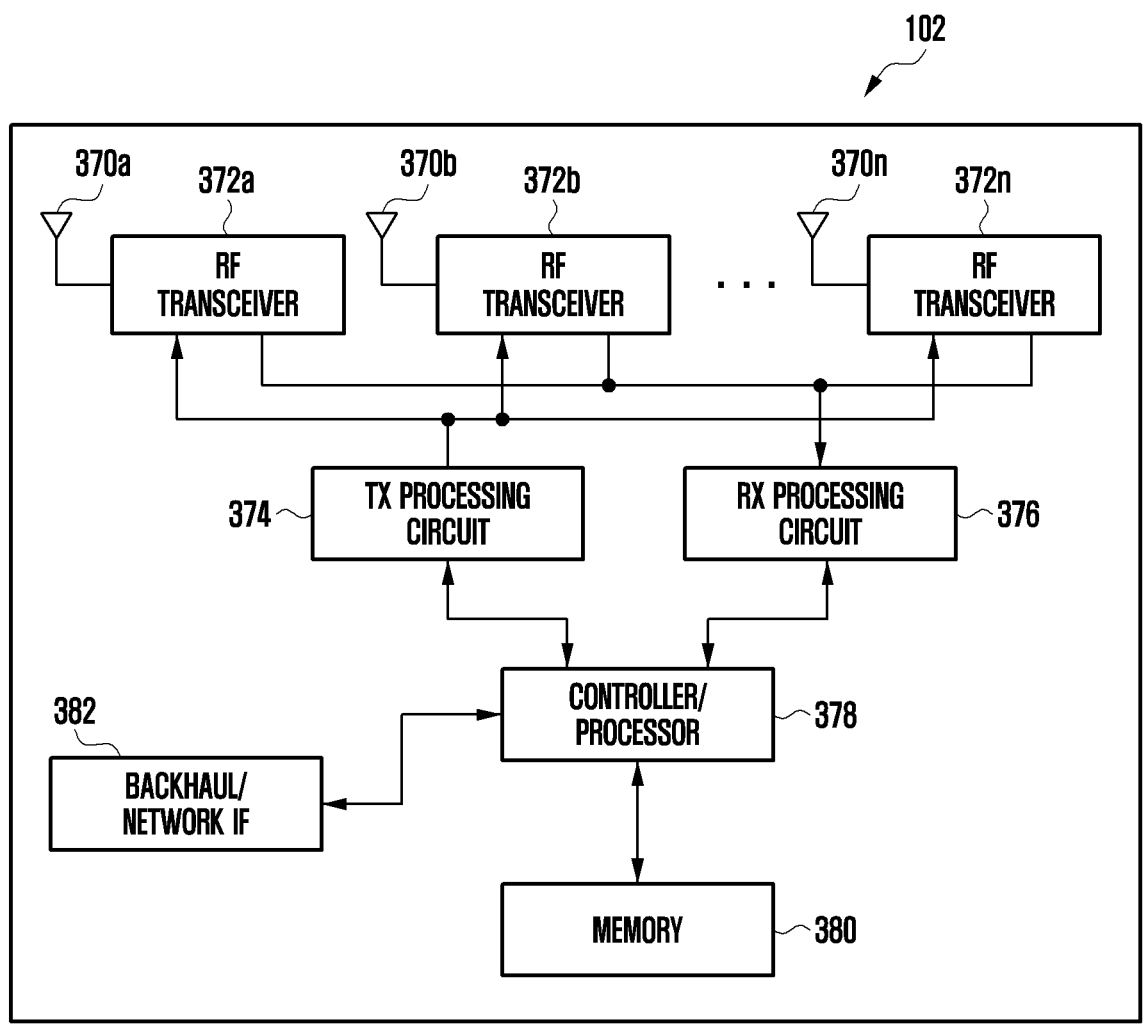
FIG. 3B illustrates a gNB according to an embodiment.

FIG. 3B illustrates an example gNB 102 according to an embodiment. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a, 370b, . . . 372n, a TX processing circuit 374, and an RX processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays. The controller/processor 378 supports communication between entities such as web real time communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an AP, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As further described below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the AP can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Those skilled in the art will understand that the terms terminal and terminal device, as used herein, include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a PDA, which may include an RF receiver, a pager, an internet/intranet access, a web browser, a notepad, a calendar and/or a global positioning system (GPS) receiver; a conventional laptop and/or palmtop computer or other devices having and/or including an RF receiver. Terminal and terminal device as used herein may be portable, transportable, installed in vehicles (aviation, sea transportation and/or land), or suitable and/or configured to operate locally, and/or in distributed form, operate on the earth and/or any other position in space. Terminal and terminal device as used herein may also be a communication terminal, an internet terminal, a music/video playing terminal, such as a PDA, a mobile Internet device (MID) and/or a mobile phone with music/video playing functions, a smart TV, a set-top box and other devices.

The rapid development of information industry, especially the increasing demand from mobile Internet and Internet of things (IoT), brings unprecedented challenges to the future mobile communication technology. According to the report of International Telecommunication Union (ITU) ITU-R M.[IMT.BEYOND 2020.TRAFFIC], it can be predicted that by 2020, compared with 2010 (4G era), the growth of mobile traffic will be nearly 1000 times, the number of UE connections will also exceed 17 billion, and the number of connected devices will be even more alarming, with the massive IoT devices gradually infiltrating into the mobile communication network. To meet the unprecedented challenges, the communication industry and academia have carried out extensive research on 5G mobile communication technology to face the 2020s. At present in ITU report ITU-R M.[IIV-IT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In the 3rd Generation Partnership Project (3GPP), the first stage of 5G is already in progress. To support more flexible scheduling, the 3GPP decides to support variable HARQ-ACK feedback delay in 5G. In existing LTE systems, a time from reception of downlink data to uplink transmission of HARQ-ACK is fixed. For example, in FDD systems, the delay is 4 subframes. In TDD systems, a HARQ-ACK feedback delay is determined for a corresponding downlink subframe based on an uplink and downlink configuration. In 5G systems, whether FDD or TDD systems, for a determined downlink time unit (e.g., a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-enhanced mobile broadband (eMBB), massive machine-type communication (mMTC) and ultra-reliable and low-latency communication (URLLC). The eMBB scenario aims to further improve data transmission rate on the basis of the existing mobile broadband service scenario, so as to enhance user experience and pursue ultimate communication experience between people. mMTC and URLLC are, for example, the application scenarios of the IoT, but their respective emphases are different: mMTC being mainly information interaction between people and things, while URLLC mainly reflecting communication requirements between things.

As described above, various services can be provided according to the development of the wireless communication systems, and thus a method for easily providing such services is required.

To solve at least the above technical problems, embodiments of the disclosure provide a method performed by a terminal, the terminal, a method performed by a base station and the base station in a wireless communication system. Hereinafter, various embodiments of the disclosure will be described in detail with reference to the accompanying drawings.

For convenience of description, a first transceiving node and a second transceiving node are defined. For example, the first transceiving node may be a base station, and the second transceiving node may be a UE. In the following examples, the base station is taken as an example (but not limited thereto) to illustrate the first transceiving node, and the UE is taken as an example (but not limited thereto) to illustrate the second transceiving node.

Figure 4:
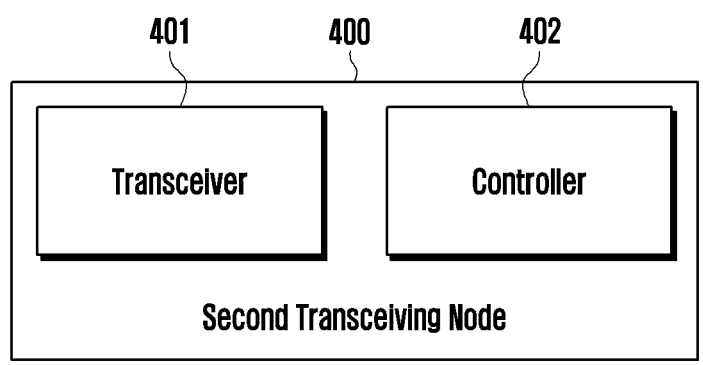
FIG. 4 illustrates a second transceiving node according to an embodiment.

FIG. 4 illustrates a second transceiving node according to an embodiment.

Referring to FIG. 4, the second transceiving node 400 includes a transceiver 401 and a controller 402.

The transceiver 401 may be configured to receive first data and/or first control signaling from the first transceiving node, and transmit second data and/or second control signaling to the first transceiving node in a determined time unit.

The controller 402 may be an application specific integrated circuit or at least one processor. The controller 402 may be configured to control the overall operation of the second transceiving node and control the second transceiving node to implement the methods disclosed herein. For example, the controller 402 may be configured to determine the second data and/or the second control signaling and a time unit for transmitting the second data and/or the second control signaling based on the first data and/or the first control signaling, and control the transceiver 401 to transmit the second data and/or the second control signaling to the first transceiving node in the determined time unit.

The controller 402 may be configured to perform one or more operations in methods of various embodiments described below. For example, the controller 402 may be configured to perform one or more of operations in the methods described in connection with FIG. 5 and/or FIG. 8.

The first data may be data transmitted by the first transceiving node to the second transceiving node. In the following examples, downlink data carried by a PDSCH is taken as an example (but not limited thereto) to illustrate the first data.

The second data may be data transmitted by the second transceiving node to the first transceiving node. In the following examples, uplink data carried by a physical uplink shared channel (PUSCH) is taken as an example to illustrate the second data, but not limited thereto.

The first control signaling may be control signaling transmitted by the first transceiving node to the second transceiving node. In the following examples, downlink control signaling is taken as an example (but not limited thereto) to illustrate the first control signaling. The downlink control signaling may be downlink control information (DCI) carried by a physical downlink control channel (PDCCH) and/or control signaling carried by a PDSCH. For example, the DCI may be UE specific DCI, and the DCI may also be common DCI. The common DCI may be DCI common to a part of UEs, such as group common DCI, and the common DCI may also be DCI common to all of the UEs. The DCI may be uplink DCI (e.g., DCI for scheduling a PUSCH) and/or downlink DCI (e.g., DCI for scheduling a PDSCH).

The second control signaling may be control signaling transmitted by the second transceiving node to the first transceiving node. In the following examples, uplink control signaling is taken as an example (but is not limited thereto) to illustrate the second control signaling. The uplink control signaling may be uplink control information (UCI) carried by a physical uplink control channel (PUCCH) and/or control signaling carried by a PUSCH. A type of UCI may include one or more of: HARQ-ACK information, a scheduling request (SR), link recovery request (LRR), channel state information (CSI) or configured grant (CG) UCI. In certain embodiments, when UCI is carried by a PUCCH, the UCI may be used interchangeably with the PUCCH.

A PUCCH carrying SR may be a PUCCH carrying positive SR and/or negative SR. The SR may be the positive SR and/or the negative SR.

The CSI may also be Part 1 CSI and/or Part 2 CSI.

A first time unit is a time unit in which the first transceiving node transmits the first data and/or the first control signaling. In the following examples, a downlink time unit is taken as an example (but not limited thereto) to illustrate the first time unit.

A second time unit is a time unit in which the second transceiving node transmits the second data and/or the second control signaling. In the following examples, an uplink time unit is taken as an example (but not limited thereto) to illustrate the second time unit.

The first time unit and the second time unit may be one or more slots, one or more subslots, one or more OFDM symbols, or one or more subframes.

Herein, depending on the network type, the term base station or BS can refer to any component (or a set of components) configured to provide wireless access to a network, such as a transmission point (TP), a transmission and reception point (TRP), an evolved base station (eNodeB or eNB), a 5G base station (gNB), a macrocell, a femtocell, a WiFi AP, or other wirelessly enabled devices. Base stations may provide wireless access in accordance with one or more wireless communication protocols, e.g., 5G 3GPP NR interface/access, LTE, LTE advanced (LTE-A), high speed packet access (HSPA), Wi-Fi 802.11a/b/g/n/ac, etc.

In describing a wireless communication system and in the below disclosure, higher layer signaling or higher layer signals are signal transferring methods for transferring information from a base station to a terminal over a downlink data channel of a physical layer or from a terminal to a base station over an uplink data channel of a physical layer, and examples of the signal transferring methods may include signal transferring methods for transferring information via radio resource control (RRC) signaling, packet data convergence protocol (PDCP) signaling, or a medium access control control element (MAC CE).

Figure 5:
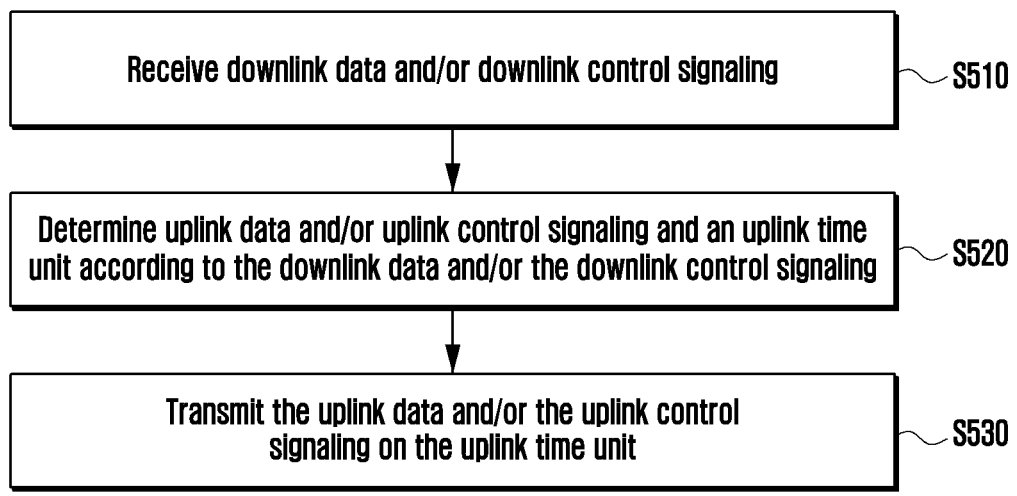
FIG. 5 is a flowchart illustrating a method performed by a UE according to an embodiment.

FIG. 5 is a flowchart illustrating a method performed by a UE according to embodiment.

Referring to FIG. 5, in step S510, the UE may receive downlink data (e.g., downlink data carried by a PDSCH) and/or downlink control signaling from a base station. For example, the UE may receive the downlink data and/or the downlink control signaling from the base station based on predefined rules and/or received configuration parameters.

In step S520, the UE determines uplink data and/or uplink control signaling and an uplink time unit based on the downlink data and/or downlink control signaling.

In step S530, the UE transmits the uplink data and/or the uplink control signaling to the base station in an uplink time unit.

In some implementations, acknowledgement/negative acknowledgement (ACK/NACK) for downlink transmissions may be performed through HARQ-ACK.

The downlink control signaling may include DCI carried by a PDCCH and/or control signaling carried by a PDSCH. For example, the DCI may be used to schedule transmission of a PUSCH or reception of a PDSCH. Some examples of uplink transmission timing will be described below with reference to FIGS. 6A-6C.

Figure 6A:
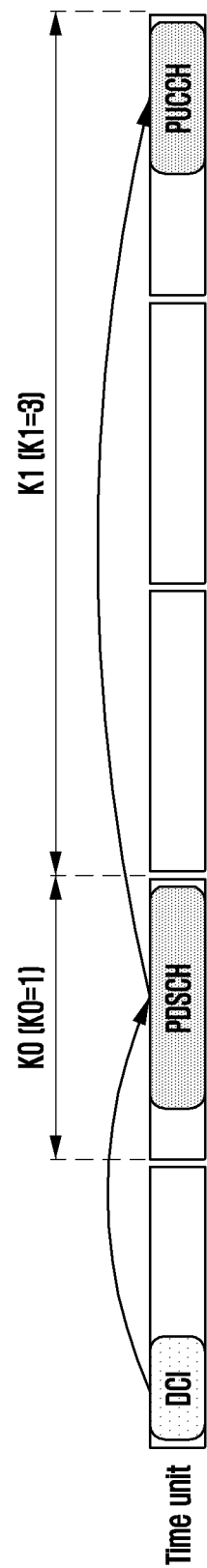
FIGS. 6A-6C illustrate examples of uplink transmission timing according to embodiments.
Figure 6B:
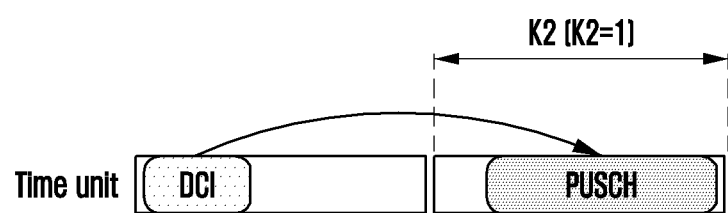
Figure 6C:
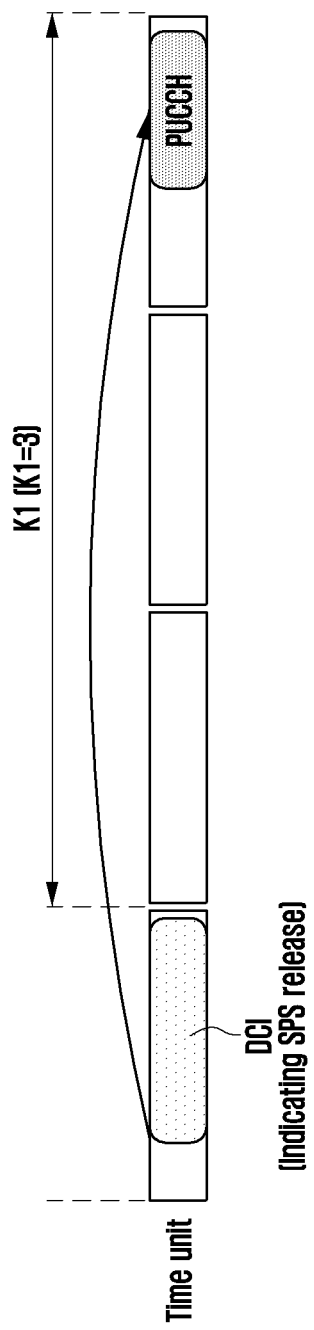

FIGS. 6A-6C illustrate examples of uplink transmission timing according to embodiments.

In an example, the UE receives the DCI and receives the PDSCH based on time domain resources indicated by the DCI. As shown in FIG. 6A, a parameter K0 is used to represent a time interval between the PDSCH scheduled by the DCI and the PDCCH carrying the DCI, with K0 as units of slots. FIG. 6A gives an example in which K0=1. In the example illustrated in FIG. 6A, the time interval from the PDSCH scheduled by the DCI to the PDCCH carrying the DCI is one slot, with a UE receives DCI being understood as the UE detects the DCI.

In another example, as illustrated in FIG. 6B, the UE receives the DCI and transmits the PUSCH based on time domain resources indicated by the DCI. A timing parameter K2 may be used to represent a time interval between the PUSCH scheduled by the DCI and the PDCCH carrying the DCI, and K2 may be in units of slots. In the example of FIG. 6B K2=1, and the time interval between the PUSCH scheduled by the DCI and the PDCCH carrying the DCI is one slot. K2 may also represent a time interval between a PDCCH for activating a CG PUSCH and the first activated CG PUSCH. Unless otherwise specified, the PUSCH may be a PUSCH scheduled by DCI (e.g., dynamic grant (DG) PUSCH) and/or a PUSCH not scheduled by DCI (e.g., CG PUSCH).

As another example, the UE receives the PDSCH, and may transmit HARQ-ACK information for the PDSCH in a PUCCH in the uplink time unit. A timing parameter (which may also be referred to as a timing value) K1 (e.g., the parameter dl-DataToUL-ACK in 3GPP) may be used to represent a time interval between the PUCCH for transmitting the HARQ-ACK information for the PDSCH and the PDSCH, and K1 may be in units of uplink time units, such as slots or subslots. In a case where K1 is in units of slots, the time interval is a value of a slot offset between the PUCCH for feeding back the HARQ-ACK information for the PDSCH and the PDSCH, and K1 may be referred to as a slot timing value. For example, FIG. 6A gives an example in which K1=3, and the time interval between the PUCCH for transmitting the HARQ-ACK information for the PDSCH and the PDSCH is 3 slots. It should be noted that in certain embodiments, the timing parameter K1 may be used interchangeably with a timing parameter $K_1$, the timing parameter K0 may be used interchangeably with a timing parameter $K_0$, and the timing parameter K2 may be used interchangeably with a timing parameter $K_2$.

In certain embodiments, the PDSCH may be a PDSCH scheduled by the DCI and/or a SPS PDSCH. The UE will periodically receive the SPS PDSCH after the SPS PDSCH is activated by the DCI. In certain examples, the SPS PDSCH may be equivalent to a PDSCH not scheduled by the DCI/PDCCH, or a PDSCH without an associated PDCCH transmission. After the SPS PDSCH is released (deactivated), the UE will no longer receive the SPS PDSCH.

In certain embodiments, HARQ-ACK may be HARQ-ACK for a SPS PDSCH reception (for example, HARQ-ACK not indicated by DCI) and/or HARQ-ACK indicated by a DCI format (for example, HARQ-ACK for a PDSCH scheduled by a DCI format).

In another example, the UE receives the DCI (e.g., DCI indicating SPS (Semi-Persistent Scheduling) PDSCH release (deactivation)), and may transmit HARQ-ACK information for the DCI in the PUCCH in the uplink time unit. For example, the timing parameter K1 may be used to represent a time interval between the PUCCH for transmitting the HARQ-ACK information for the DCI and the DCI, and K1 may be in units of uplink time units, such as slots or subslots.

FIG. 6C provides an example in which K1=3. In FIG. 6C, the time interval between the PUCCH for transmitting the HARQ-ACK information for the DCI and the DCI is 3 slots. For example, the timing parameter K1 may be used to represent a time interval between a PDCCH reception carrying DCI indicating SPS PDSCH release (deactivation) and the PUCCH feeding back HARQ-ACK for the PDCCH reception.

In certain implementations, in operation S520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

In certain implementations, the base station may configure higher layer signaling for the UE based on a UE capability previously received from the UE (for example, in operation S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

In certain implementations, downlink channels (downlink resources) may include PDCCHs and/or PDSCHs. Uplink channels (uplink resources) may include PUCCHs and/or PUSCHs.

In certain implementations, the UE may be configured with two levels of priorities for uplink transmission. For example, the two levels of priorities may include a first priority and a second priority which are different from each other. In an example, the first priority may be higher than the second priority. In another example, the first priority may be lower than the second priority. However, embodiments of the disclosure are not limited to this, and for example, the UE may be configured with more than two levels of priorities. For the sake of convenience, the description herein is made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

The UE may be configured with a subslot-based PUCCH transmission. For example, a subslot length parameter (which may also be referred to as a parameter with respect to a subslot length in embodiments of the disclosure) (e.g., the parameter subslotLengthForPUCCH in 3GPP) of each PUCCH configuration parameter of the first PUCCH configuration parameter and the second PUCCH configuration parameter may be 7 OFDM symbols or 6 OFDM symbols or 2 OFDM symbols. Subslot configuration length parameters in different PUCCH configuration parameters may be configured separately. If no subslot length parameter is configured in a PUCCH configuration parameter, the scheduling time unit of this PUCCH configuration parameter is one slot by default. If a subslot length parameter is configured in the PUCCH configuration parameter, the scheduling time unit of this PUCCH configuration parameter is L OFDM symbols, with L as the configured subslot configuration length.

The mechanism of slot-based PUCCH transmissions is basically the same as that of subslot-based PUCCH transmissions. In the disclosure, a slot may be used to represent a PUCCH occasion unit. For example, if the UE is configured with subslots, a slot which is a PUCCH occasion unit may be replaced with a subslot. For example, it may be specified by protocols that if the UE is configured with the subslot length parameter (e.g., the parameter subslotLengthForPUCCH in 3GPP), unless otherwise indicated, a number of symbols contained in the slot of the PUCCH transmission is indicated by the subslot length parameter.

For example, if the UE is configured with the subslot length parameter, and subslot n is the last uplink subslot overlapping with a PDSCH reception or PDCCH reception (e.g., SPS PDSCH release, and/or indicating secondary cell dormancy, and/or triggering a Type-3 HARQ-ACK codebook report and without scheduling a PDSCH reception), then HARQ-ACK information for the PDSCH reception or PDCCH reception is transmitted in an uplink subslot n+k, where k is determined by the timing parameter K1 (the definition of the timing parameter K1 may refer to the previous description). For another example, if the UE is not configured with the subslot length parameter, and slot n is the last uplink slot overlapping with a downlink slot where the PDSCH reception or PDCCH reception is located, then the HARQ-ACK information for the PDSCH reception or PDCCH reception is transmitted in an uplink slot n+k, where K is determined by the timing parameter K1.

In the disclosure, unicast may refer to a manner in which a network communicates with a UE, and multicast may refer to a manner in which a network communicates with multiple UEs. For example, a unicast PDSCH may be a PDSCH received by a UE, and the scrambling of the PDSCH may be based on a radio network temporary identifier (RNTI) specific to the UE, e.g., Cell-RNTI (C-RNTI). A multicast PDSCH may be a PDSCH received by more than one UE simultaneously, and the scrambling of the multicast PDSCH may be based on a UE-group common RNTI. For example, the UE-group common RNTI for scrambling the multicast PDSCH may include an RNTI (referred to as G-RNTI in embodiments of the disclosure) for scrambling of a dynamically scheduled multicast transmission (e.g., a PDSCH) or an RNTI (referred to as G-CS-RNTI herein) for scrambling of a multicast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH. UCI(s) of the multicast PDSCH may include HARQ-ACK information for the multicast PDSCH. Herein, multicast may be replaced by broadcast.

A HARQ-ACK codebook may include HARQ-ACK information for one or more PDSCHs and/or DCI. If the HARQ-ACK information for the one or more PDSCHs and/or DCI is transmitted in a same uplink time unit, the UE may generate the HARQ-ACK codebook based on a predefined rule. For example, if a PDSCH is successfully decoded, the HARQ-ACK information for this PDSCH is positive ACK. The positive ACK may be represented by 1 in the HARQ-ACK codebook, for example. If a PDSCH is not successfully decoded, the HARQ-ACK information for this PDSCH is negative ACK (NACK). A NACK may be represented by 0 in the HARQ-ACK codebook. For example, the UE may generate the HARQ-ACK codebook based on the pseudo code specified by protocols. If the UE receives a DCI format that indicates SPS PDSCH release (deactivation), the UE may transmit HARQ-ACK information (ACK) for the DCI format. In another example, if the UE receives a DCI format that indicates secondary cell dormancy, the UE transmits the HARQ-ACK information (ACK) for the DCI format. In yet another example, if the UE receives a DCI format that indicates to transmit HARQ-ACK information (e.g., a Type-3 HARQ-ACK codebook in 3GPP) of all HARQ-ACK processes of all configured serving cells, the UE transmits the HARQ-ACK information of all HARQ-ACK processes of all configured serving cells. To reduce a size of the Type-3 HARQ-ACK codebook, in an enhanced Type-3 HARQ-ACK codebook, the UE may transmit HARQ-ACK information of a specific HARQ-ACK process of a specific serving cell based on an indication of the DCI. In yet another example, if the UE receives a DCI format that schedules a PDSCH, the UE transmits HARQ-ACK information for the PDSCH. In yet another example, the UE receives a SPS PDSCH, and the UE transmits HARQ-ACK information for the SPS PDSCH reception. In yet another example, if the UE is configured by higher layer signaling to receive a SPS PDSCH, the UE transmits HARQ-ACK information for the SPS PDSCH reception. The reception of the SPS PDSCH configured by higher layer signaling may be cancelled by other signaling. In yet another example, if at least one uplink symbol (e.g., an OFDM symbol) of the UE in a semi-static frame structure configured by higher layer signaling overlaps with a symbol of the SPS PDSCH reception, the UE does not receive the SPS PDSCH. In yet another example, if the UE is configured by higher layer signaling to receive a SPS PDSCH according to a predefined rule, the UE transmits HARQ-ACK information for the SPS PDSCH reception. Herein, A overlaps with B may mean that A at least partially overlaps with B. That is, A overlaps with B includes a case where A completely overlaps with B.

In certain implementations, if HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCH receptions, the UE may generate HARQ-ACK information according to a rule for generating a SPS PDSCH HARQ-ACK codebook.

In certain implementations, if HARQ-ACK information transmitted in a same uplink time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ-ACK codebook (e.g., Type-1 HARQ-ACK codebook in 3GPP) or a dynamic HARQ-ACK codebook (e.g., Type-2 HARQ-ACK codebook in 3GPP) according to a PDSCH HARQ-ACK codebook configuration parameter (e.g., the parameter pdsch-HARQ-ACK-Codebook in 3GPP). The dynamic HARQ-ACK codebook may also be an enhanced dynamic HARQ-ACK codebook (e.g., Type-2 HARQ-ACK codebook based on grouping and HARQ-ACK retransmission in 3GPP).

In certain implementations, if HARQ-ACK information transmitted in a same uplink time unit includes only HARQ-ACK information for a SPS PDSCH (e.g., a PDSCH not scheduled by a DCI format), the UE may generate the HARQ-ACK codebook according to a rule for generating a HARQ-ACK codebook for a SPS PDSCH reception (e.g., the pseudo code for generating a HARQ-ACK codebook for a SPS PDSCH reception defined in 3GPP).

The semi-static HARQ-ACK codebook (e.g., 3GPP TS 38.213 Type-1 HARQ-ACK codebook) may determine the size of the HARQ-ACK codebook and an order of HARQ-ACK bits according to a semi-statically parameter (e.g., a parameter configured by higher layer signaling). For a serving cell c, an active downlink bandwidth part (BWP) and an active uplink BWP, the UE determines a set of $M_{A,c}$ occasions for candidate PDSCH receptions for which the UE can transmit corresponding HARQ-ACK information in a PUCCH in an uplink slot $n_U$.

$M_{A,c}$ may be determined by at least one of:
a) HARQ-ACK slot timing values K1 of the active uplink BWP;
b) a downlink TDRA table;
c) an uplink sub-carrier spacing (SCS) configuration and a downlink SCS configuration;
d) a semi-static uplink and downlink frame structure configuration; and
e) a downlink slot offset parameter (e.g., the 3GPP parameter $N_{slot,offset,c}^{DL}$) for the serving cell c and its corresponding SCS parameter (e.g., the 3GPP parameter $\mu_{offset,DL,c}$), and a slot offset parameter (e.g., the 3GPP parameter $N_{slot,offset}^{UL}$) NV for a primary serving cell and its corresponding SCS parameter (e.g., the 3GPP parameter $\mu_{offset,UL}$).

The parameter K1 is used to determine a candidate uplink slot, and then determine candidate downlink slots according to the candidate uplink slot. The candidate downlink slots satisfy at least one of the following conditions: (i) if the time unit of the PUCCH is a subslot, the end of at least one candidate PDSCH reception in the candidate downlink slots overlaps with the candidate uplink slot in time domain; or (ii) if the time unit of the PUCCH is a slot, the end of the candidate downlink slots overlap with the candidate uplink slot in time domain. In certain embodiments, a starting symbol may be used interchangeably with a starting position, and an end symbol may be used interchangeably with an end position. In some implementations, the starting symbol may be replaced by the end symbol, and/or the end symbol may be replaced by the starting symbol.

A number of PDSCHs in a candidate downlink slot for which HARQ-ACK needs to be fed back may be determined by a maximum value of a number of non-overlapping valid PDSCHs in the downlink slot (for example, the valid PDSCHs may be PDSCHs that do not overlap with semi-statically configured uplink symbols). Time domain resources occupied by the PDSCHs may be determined by (i) a TDRA table configured by higher layer signaling (in certain embodiments, it may also be referred to as a table associated with TDRA) and (ii) a certain row in the TDRA table dynamically indicated by DCI. Each row in the TDRA table may define information with respect to TDRA. For example, for the TDRA table, an indexed row defines a timing value (e.g., time unit (e.g., slot) offset (e.g., K0)) between a PDCCH and a PDSCH, and a start and length indicator (SLIV), or directly defines a starting symbol and allocation length. For example, for the first row of the TDRA table, a start OFDM symbol is 0 and an OFDM symbol length is 4; for the second row of the TDRA table, the start OFDM symbol is 4 and the OFDM symbol length is 4; and for the third row of the TDRA table, the start OFDM symbol is 7 and the OFDM symbol length is 4. The DCI for scheduling the PDSCH may indicate any row in the TDRA table. When all OFDM symbols in the downlink slot are downlink symbols, the maximum value of the number of non-overlapping valid PDSCHs in the downlink slot is 2. At this time, the Type-1 HARQ-ACK codebook may need to feed back HARQ-ACK information for two PDSCHs in the downlink slot on the serving cell.

FIGS. 7A and 7B are examples of a TDRA tables according to embodiments. FIG. 7A illustrates a TDRA table in which one PDSCH is scheduled by one row. FIG. 7B illustrates a TDRA table in which multiple PDSCHs are scheduled by one row. Referring to FIG. 7A, each row corresponds to a value of a timing parameter K0, a value of S indicating a starting symbol, and a value of L indicating a length, where an SLIV may be determined by the value of S and the value of L. Referring to FIG. 7B, unlike FIG. 7A, each row corresponds to values of multiple sets of {K0, S, L}.

In certain implementations, the dynamic HARQ-ACK codebook and/or the enhanced dynamic HARQ-ACK codebook may determine a size and an order of the HARQ-ACK codebook according to an assignment indicator. For example, the assignment indicator may be a downlink assignment indicator (DAI). In the following embodiments, the assignment indicator as the DAI is taken as an example for illustration. However, the embodiments of the disclosure are not limited thereto, and any other suitable assignment indicator may be adopted.

In certain implementations, a DAI field includes at least one of a first DAI and a second DAI.

In certain examples, the first DAI may be a counter-DAI (C-DAI). The first DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to: an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or an accumulative number of PDCCH(s) up to the current time unit; or an accumulative number of PDSCH transmission(s) up to the current time unit; or an accumulative number of {serving cell, time unit} pair(s) in which PDSCH transmission(s) related to PDCCH(s) (e.g., scheduled by the PDCCH(s)) and/or PDCCH(s) (e.g., a PDCCH indicating SPS release and/or PDCCH indicating secondary cell dormancy) is present, up to the current serving cell and/or the current time unit; or an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit.

The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

In certain examples, the second DAI may be a total-DAI (T-DAI). The second DAI may indicate a total number of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to: a total number of {serving cell, time unit} pairs scheduled by PDCCH(s) up to the current time unit within a time window (which may also include a number of PDCCHs for indicating SPS release); or a total number of PDSCH transmissions up to the current time unit; or a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit; or a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or a total number of PDSCHs (the PDSCHs are PDSCHs with corresponding PDCCHs) already scheduled by the base station up to the current serving cell and/or the current time unit; or a total number of time units with PDSCH transmissions (for example, the PDSCHs are PDSCHs with corresponding PDCCHs) already scheduled by the base station up to the current serving cell and/or the current time unit.

The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, without being limited thereto.

Tables 1 and 2, below, show a correspondence between the DAI field and $V_{T-DAI,m}$ or $V_{C-DAI,c,m}$. Numbers of bits of the C-DAI and T-DAI are limited.

For example, in a case where the C-DAI or T-DAI is represented with 2 bits, the value of the C-DAI or T-DAI in the DCI may be determined by equations in Table 1. $V_{T-DAI,m}$ is the value of the T-DAI in DCI received in a PDCCH Monitoring Occasion (MO) m, and $V_{C-DAI,c,m}$ is the value of the C-DAI in DCI for a serving cell c received in the PDCCH monitoring occasion m. Both $V_{T-DAI,m}$ and $V_{C-DAI,c,m}$ are related to a number of bits of the DAI field in the DCI. MSB is the Most Significant Bit and LSB is the Least Significant Bit.

TABLE 1

| MSB, LSB of DAI Field | $V_{T-DAI, m}$ or $V_{C-DAI, c, m}$ | Y |
| --- | --- | --- |
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 1, all of the DAI field are indicated with "00", and the value of $V_{T-DAI,m}$ or $V_{C-DAI,c,m}$ is represented as "1" by the equation in Table 1. Y may represent the value of the DAI corresponding to the number of DCIS actually transmitted by the base station (the value of the DAI before conversion by the equation in the table).

For example, in a case where the C-DAI or T-DAI in the DCI is 1 bit, values greater than 2 may be represented by equations in Table 2, below.

TABLE 2

| DAI field | $V_{T-DAI, m}$ or $V_{C-DAI, c, m}$ | Y |
| --- | --- | --- |
| 0 | 1 | (Y − 1) mod 2 + 1 = 1 |
| 1 | 2 | (Y − 1) mod 2 + 1 = 2 |

Unless the context clearly indicates otherwise, all or one or more of the methods, steps and operations described in the embodiments herein may be specified by protocols and/or configured by higher layer signaling and/or indicated by dynamic signaling. The dynamic signaling may be PDCCH and/or DCI and/or DCI format. For example, SPS PDSCH and/or CG PUSCH may be dynamically indicated in corresponding activated DCI/DCI format/PDCCH. All or one or more of the described methods, steps and operations may be optional. For example, if a certain parameter (e.g., parameter X) is configured, the UE performs an approach (e.g., approach A). Otherwise (if the parameter, e.g., parameter X, is not configured), the UE performs another approach (e.g., approach B).

It should be noted that, a primary cell (PCell) or primary secondary cell (PSCell) in embodiments may be used interchangeably with a cell having a PUCCH.

It should be noted that methods for downlink in embodiments of the disclosure may also be applicable to uplink, and methods for uplink may also be applicable to downlink. For example, a PDSCH may be replaced with a PUSCH, a SPS PDSCH may be replaced with CG PUSCH, and downlink symbols may be replaced with uplink symbols, so that methods for downlink may be applicable to uplink.

It should be noted that methods applicable to scheduling of multiple PDSCH/PUSCHs in embodiments of the disclosure may also be applicable to a PDSCH/PUSCH transmission with repetitions. For example, a PDSCH/PUSCH of multiple PDSCH/PUSCHs may be replaced by a repetition of multiple repetitions of the PDSCH/PUSCH transmission.

It should be noted that the multiple steps in the methods according to certain embodiments may be implemented in any order.

It should be noted that in methods according to certain embodiments, multiple PDSCHs/PUSCHs scheduled by a PDCCH and/or a DCI and/or a DCI format may be multiple PDSCHs/PUSCHs on a same serving cell and/or multiple PDSCHs/PUSCHs on different serving cells.

The UE may be configured to simultaneously receive a unicast PDSCH and a multicast PDSCH, and when the reception of the unicast PDSCH and the multicast PDSCH goes beyond a UE capability, how to receive the PDSCH is a problem to be solved.

In certain implementations, the UE may indicate a manner in which the UE can receive the PDSCH through UE capability reporting. For example, the UE may report capabilities related to the PDSCH reception, such as at least one of UE capabilities 1 to 17 described below.

UE capability 1 (also referred to as a first UE capability in the disclosure; e.g., 3GPP UE capability FDM-ed unicast PDSCH and group-common PDSCH): a frequency domain multiplexing (FDM)-based (e.g., FDM-ed) unicast and multicast PDSCHs may be received. For example, the UE may receive at most C1 (e.g., a maximum number C1 of) unicast PDSCHs and at most C2 (e.g., a maximum number C2 of) multicast PDSCHs in a slot. C1 and C2 may be positive integers. For example, C1=1, and C2=1.

UE capability 2 (also referred to as a second UE capability in the disclosure; for example, 3GPP UE capability Intra-slot TDM-ed unicast PDSCH and group-common PDSCH): within a time unit (e.g., a slot), time domain multiplexing (TDM)-based (e.g., TDM-ed) unicast and multicast PDSCHs may be received. For example, the UE may receive at most 1 unicast PDSCH and at most 1 multicast PDSCH in a slot. For example, the UE may receive at most M (M>1) TDM-based (e.g., TDM-ed) unicast PDSCHs and at most 1 multicast PDSCH in a slot on a serving cell. For example, the UE may receive at most N (N>1) TDM-ed multicast PDSCHs in a slot on a serving cell. For example, the UE may receive at most K (K>1) TDM-ed unicast PDSCHs and at most L (L>1) multicast PDSCHs in a slot on a serving cell. For another example, a total number of unicast PDSCHs and multicast PDSCHs that the UE can receive at most in a slot is one of {2, 4, 7}. The UE may report one of {2, 4, 7} through the UE capability reporting to indicate the total number (e.g., maximum total number) of unicast PDSCHs and multicast PDSCHs that the UE can receive at most in a slot.

UE capability 3 (also referred to as a third UE capability in the disclosure; e.g., 3GPP UE capability dynamic scheduling for multicast): the multicast PDSCH (e.g., dynamically scheduled multicast PDSCH) may be received.

UE capability 4 (also referred to as a fourth UE capability in the disclosure): when a unicast PDSCH conflicts or collides with a multicast PDSCH, the UE receives the unicast PDSCH.

UE capability 5 (also referred to as a fifth UE capability in the disclosure): when a unicast PDSCH collides with a multicast PDSCH, the UE receives the multicast PDSCH.

UE capability 6 (also referred to as a sixth UE capability in the disclosure): when a unicast PDSCH scheduled by DCI collides with a multicast PDSCH, the UE receives the unicast PDSCH.

UE capability 7 (also referred to as a seventh UE capability in the disclosure): when a unicast PDSCH scheduled by DCI collides with a multicast PDSCH scheduled by DCI, the UE receives the unicast PDSCH.

UE capability 8 (also referred to as an eighth UE capability in the disclosure): when a unicast PDSCH scheduled by DCI collides with a multicast SPS PDSCH, the UE receives the unicast PDSCH.

UE capability 9 (also referred to as a ninth UE capability in the disclosure): when a unicast SPS PDSCH collides with a multicast SPS PDSCH, the UE receives the unicast PDSCH.

UE capability 10 (also referred to as a tenth UE capability in the disclosure): when a unicast SPS PDSCH collides with a multicast PDSCH, the UE receives the unicast PDSCH.

UE capability 11 (also referred to as an eleventh UE capability in the disclosure): when a unicast SPS PDSCH collides with a multicast PDSCH scheduled by DCI, the UE receives the unicast PDSCH.

UE capability 12 (also referred to as a twelfth UE capability in the disclosure): when a multicast PDSCH scheduled by DCI collides with a unicast PDSCH scheduled by DCI, the UE receives the multicast PDSCH.

UE capability 13 (also referred to as a thirteenth UE capability in the disclosure): when a multicast PDSCH scheduled by DCI collides with a unicast SPS PDSCH, the UE receives the multicast PDSCH.

UE capability 14 (also referred to as a fourteenth UE capability in the disclosure): when a multicast SPS PDSCH collides with a unicast SPS PDSCH, the UE receives the multicast PDSCH.

UE capability 15 (also referred to as a fifteenth UE capability in the disclosure):

when a multicast SPS PDSCH collides with a unicast PDSCH, the UE receives the multicast PDSCH.

UE capability 16 (also referred to as a sixteenth UE capability in the disclosure): when a multicast SPS PDSCH collides with a unicast PDSCH scheduled by DCI, the UE receives the multicast PDSCH.

UE capability 17 (also referred to as a seventeenth UE capability in the disclosure): when a multicast PDSCH scheduled by DCI collides with a unicast PDSCH, the UE receives the multicast PDSCH.

It should be noted that, a unicast PDSCH collides with a multicast PDSCH may mean that the unicast PDSCH overlaps with the multicast PDSCH in time domain and/or frequency domain, and/or the scheduled unicast PDSCH and multicast PDSCH go beyond the UE capability.

In certain implementations, PDSCHs scheduled to be received in a time unit (e.g., slot) may go beyond the UE capability. In certain implementations, for example, if at least one of the following conditions COND1 to COND4 is satisfied, it may be considered that the PDSCHs scheduled to be received in a slot may go beyond the UE capability. In the disclosure, the expression PDSCHs scheduled to be received in a slot go beyond the UE capability may mean or be equivalent to at least one of conditions COND1 to COND4 being satisfied.

Condition COND1: in a slot on a serving cell, a number of scheduled unicast PDSCHs is greater than (or greater than or equal to) F1 and/or a number of the scheduled multicast PDSCHs is greater than (or greater than or equal to) F2, where F1 and F2 are integers. F1 and/or F2 may be a specified value. Additionally or alternatively, F1 and/or F2 may be determined based on the UE capability. For example, when the UE reports the first UE capability, and the first UE capability indicates that the UE can receive (for example, support receiving) at most $C1=1$ unicast PDSCH and at most $C2=1$ multicast PDSCH in a slot, it may be determined that F1 is equal to 1 and F2 is equal to 1. For another example, the UE does not report the first UE capability and the UE does not report the second UE capability. The UE reports the third UE capability. It may be determined that F1 is equal to 1 and F2 is equal to 1. If a unicast PDSCH and a multicast PDSCH are scheduled in a slot on a serving cell, it may be considered that the PDSCHs scheduled to be received in a slot may go beyond the UE capability.

Condition COND2: in a slot on a serving cell, a number of scheduled unicast PDSCHs is greater than (or greater than or equal to) T1 and/or a number of scheduled multicast PDSCHs is greater than (or greater than or equal to) T2 and/or a number of the scheduled PDSCHs (e.g., a sum of the number of the scheduled unicast PDSCHs and the number of the scheduled multicast PDSCHs) is greater than (or greater than or equal to) T3, where T1, T2 and T3 are integers. Each of T1, T2 or T3 may be a specified value. Additionally or alternatively, each of T1, T2 or T3 may be determined based on the UE capability. For example, when the UE reports the second UE capability, and the second UE capability indicates that a total number of the TDM-ed unicast and multicast PDSCHs that the UE can (for example, support) receive in a slot is at most 7, it may be determined that T3 is equal to 7.

Condition COND3: in a slot on a serving cell, a number of scheduled unicast PDSCHs is greater than (or greater than or equal to) M1 and/or a number of scheduled multicast PDSCHs is greater than (or greater than or equal to) M2 and/or the scheduled unicast PDSCHs overlap with the scheduled multicast PDSCHs in time domain and/or the scheduled unicast PDSCHs overlaps with the scheduled multicast PDSCHs in both time domain and frequency domain. For example, the unicast PDSCH and the multicast PDSCH have a same TRP (e.g., same 3GPP parameter coresetPoolIndex). M1 and/or M2 may be a specified value. Additionally or alternatively, M1 and/or M2 may be determined based on the first UE capability and/or the second UE capability reported by the UE.

Condition COND4: multiple scheduled PDSCHs (for example, 2 PDSCHs; for another example, one unicast PDSCH and one multicast PDSCH) overlap in both time domain and frequency domain. For example, the multiple PDSCHs are multiple PDSCHs with the same TRP (e.g., same 3GPP parameter coresetPoolIndex).

In each of the above-described conditions, the scheduled PDSCHs may be PDSCHs (e.g., TDM-ed PDSCHs) that are not overlap in time domain. Alternatively, the scheduled PDSCHs may also be PDSCHs that overlap in time domain.

In the embodiments of the disclosure, PDSCHs scheduled to be received in a slot may be replaced by PDSCHs scheduled to be received in a slot on a serving cell.

When PDSCHs scheduled to be received in a slot go beyond the UE capability, it is necessary to consider how the UE receives PDSCHs. In some implementations, how the UE receives PDSCHs (or determines PDSCHs to be actually (or finally) received or PDSCHs that the UE is expected to receive) may be determined by at least one of the following manners MN1A to MN1E (MN1A, MN1B, MN1C, MN1D, and MN1E). For example, if the PDSCHs scheduled to be received in a slot go beyond the UE capability, it may be specified by protocols and/or configured by higher layer signaling that, how the UE receives PDSCHs (or determines PDSCHs to be actually received) may be determined by at least one of the following manners MN1A to MN1E. For example, if a predefined condition is satisfied, how the UE receives the PDSCHs (or determines the PDSCHs to be actually received) may be determined by at least one of the following manners MN1A to MN1E. For example, the predefined condition may be at least one of conditions COND5 to COND17. For example, in the disclosure, determining that the UE receives PDSCHs or determining PDSCHs for reception may be understood as determining PDSCH(s) that the UE is to receive (or decode). Or, determining that the UE receives PDSCHs or determining PDSCHs for reception may be understood as determining PDSCH(s) that the UE is expected to receive (or decode). After determining the PDSCHs for reception, the UE may perform PDSCH reception based on the determined PDSCHs for reception. It should be noted that, the PDSCHs determined to be received or the PDSCHs determined for reception in the intermediate steps may be determined not to be received or cancelled to be received in the subsequent steps.

Condition COND5: a number of scheduled unicast SPS PDSCHs is greater than (or greater than or equal to) F1. F1 may be determined based on the first UE capability reported by the UE.

Condition COND6: a number of scheduled multicast PDSCHs is greater than (or greater than or equal to) F2. F2 may be determined based on the first UE capability reported by the UE.

Condition COND7: at least one unicast SPS PDSCH of the scheduled unicast SPS PDSCHs overlaps with at least one multicast PDSCH of the scheduled multicast PDSCHs in time domain.

Condition COND8: at least one unicast SPS PDSCH of the scheduled unicast SPS PDSCHs overlaps with at least one multicast PDSCH of the scheduled multicast PDSCHs in frequency domain.

Condition COND9: at least one unicast SPS PDSCH of the scheduled unicast SPS PDSCHs overlaps with at least one multicast PDSCH of the scheduled multicast PDSCHs in both time domain and frequency domain.

Condition COND10: at least one unicast SPS PDSCH of the scheduled unicast SPS PDSCHs does not overlap with at least one multicast PDSCH of the scheduled multicast PDSCHs in time domain.

Condition COND11: at least one unicast SPS PDSCH of the scheduled unicast SPS PDSCHs does not overlap with at least one multicast PDSCH of the scheduled multicast PDSCHs in frequency domain.

Condition COND12: a parameter indicating that FDM-ed unicast and multicast SPS PDSCHs may be received is configured (or not configured) by higher layer signaling.

Condition COND13: a parameter indicating that a unicast (or multicast) PDSCH is received when the unicast PDSCH collides with the multicast PDSCH (for example, the unicast PDSCH overlaps with the multicast PDSCH in time domain and/or frequency domain; for another example, the scheduled unicast PDSCHs and multicast PDSCHs go beyond the UE capability) is configured (or not configured) by higher layer signaling.

Condition COND14: a parameter indicating that a unicast (or multicast) PDSCH scheduled by a PDCCH may cancel a multicast (or unicast) SPS PDSCH is configured (or not configured) by higher layer signaling.

Condition COND15: a predefined timing condition.

Condition COND16: the UE reports a capability to support receiving a multicast PDSCH.

Condition COND17: the UE does not report a capability (e.g., one or more of the first UE capability, the second UE capability, the third UE capability, or the capability to support receiving a multicast PDSCH).

Manner MN1A

In manner MN1A, valid SPS PDSCH(s) is (are) determined, and a PDSCH for reception is determined based on the determined valid SPS PDSCH(s). For example, whether a PDSCH is valid or not may be determined based on whether time domain resources of the PDSCH overlap with first predefined symbols. The first predefined symbols may be semi-statically configured uplink symbols (configured by higher layer signaling) (e.g., uplink symbols configured by the 3GPP parameter tdd-UL-DL-ConfigurationCommon or tdd-UL-DL-ConfigurationDedicated). When time domain resources of a PDSCH does not overlap with the first predefined symbols in time domain, the PDSCH is a valid PDSCH. When the time domain resources of the PDSCH overlaps with at least one of the first predefined symbols, the PDSCH is an invalid PDSCH (non-valid PDSCH). The UE may receive a valid PDSCH. The UE may not receive and/or not expect to receive an invalid PDSCH.

When manner MN1A is combined with other manners, manner MN1A may be performed first.

Manner MN1B

In manner MN1B, the PDSCH for reception may be determined according to one or more of the following steps.

Step one: determine to receive unicast SPS PDSCH(s) and/or multicast SPS PDSCH(s).

Step two: determine to receive unicast PDSCH(s) and/or multicast PDSCH(s).

The PDSCH may be a SPS PDSCH and/or a PDSCH scheduled by DCI.

The method can reduce the probability that the UE and the base station have inconsistent understanding of whether the PDSCH is received or not due to missing detection for DCI, and can improve the reliability of the downlink transmission.

Manner MN1C

In manner MN1C, the PDSCH for reception may be determined according to one or more of the following steps.

Step one: determine to receive unicast PDSCH(s).

Step two: determine to receive multicast PDSCH(s).

It should be noted that the order of step one and step two may be exchanged.

For example, the PDSCH may be a SPS PDSCH and/or a PDSCH scheduled by DCI.

For example, manner MN1B may be performed after manner MN1C is performed.

The method can reduce the complexity of the UE and/or base station implementation.

Manner MN1D

In manner MN1D, the PDSCH for reception may be determined according to one or more of the following steps.

Step one: determine to receive PDSCH(s) with a higher priority. For example, the determining may be based on other embodiments.

Step two: determine to receive PDSCH(s) with a lower priority. For example, the determining may be based on other embodiments.

The order of step one and step two may be exchanged.

A priority of a PDSCH may be configured by higher layer signaling (e.g., a priority of a SPS PDSCH) and/or indicated by dynamic signaling (e.g., a priority of a PDSCH scheduled by DCI).

For example, if the PDSCH(s) with the higher priority determined to be received and the PDSCH(s) with the lower priority determined to be received do not go beyond the UE capability, the UE receives the PDSCH(s) with the higher priority determined to be received and the PDSCH(s) with the lower priority determined to be received.

For example, if the PDSCH(s) with the higher priority determined to be received and the PDSCH(s) with the lower priority determined to be received go beyond the UE capability, the UE determines the PDSCH for reception according to a predefined method. For example, the UE only receives the PDSCH(s) with the higher priority determined to be received. For another example, it may be determined according to the methods in other embodiments of the disclosure (e.g., manner MN1B or MN1C; for example, manner MN1B or MN1C is applied by replacing the unicast (SPS)PDSCH(s) by the PDSCH(s) with the higher (or lower) priority and replacing the multicast (SPS)PDSCH(s) by the PDSCH(s) with the lower (or higher) priority.

The method can improve the reliability of transmission of the downlink data with the higher priority.

Manner MN1E

In manner MN1E, it may be specified by protocols and/or configured by higher layer signaling that, the UE does not expect that unicast PDSCHs and/or multicast PDSCHs received in a slot go beyond the UE capability. For example, the UE does not expect that one or more of conditions COND1 to COND4 are satisfied.

It should be noted that, manner MN1E may be performed after manner MN1A and/or MN1B and/or MN1C.

It should be noted that a PDSCH in the scheme may be replaced by a SPS PDSCH.

The method can reduce the complexity of the UE and/or base station implementation. Manner MN1A to MN1E clarify the behavior of the UE, improve the reliability of the downlink data transmission, improve the flexibility of the network scheduling, and thus improve the spectrum efficiency of the system.

In some implementations (e.g., in step one of manner MN1B), when the UE determines to receive unicast SPS PDSCH(s) and/or multicast SPS PDSCH(s), the reception of the PDSCH may be determined by at least one of the following manners MN2A to f MN2E (MN2A, MN2B, MN2C, MN2D, and MN2E).

Manner MN2A

In manner MN2A, the reception of the PDSCH may be determined according to one or more of steps one and two, as set forth below.

Step one: determine to receive the unicast SPS PDSCH(s). For example, the UE may assume that there is no multicast SPS PDSCH (or there is only the unicast SPS PDSCH(s)), and determine to receive the unicast SPS PDSCH(s) according to pseudo code-1.

Pseudo code-1

Step 0: set j=0, where j is the number of selected PDSCHs for decoding. Q is a set of activated SPS PDSCHs in a slot.

Step 1: the UE receives one PDSCH with the lowest SPS PDSCH index in Q, set j=j+1. Designate the received PDSCH as a survivor PDSCH.

Step 2: the survivor PDSCH and any other PDSCH(s) overlapping (including partially overlapping and completely overlapping) with the survivor PDSCH in step one are excluded from Q.

Step 3: repeat steps 1 and 2 until Q is empty or j is equal to a maximum number of PDSCHs (unicast PDSCHs and/or multicast PDSCHs) in a slot supported by the UE.

For another example, the reception of the unicast SPS PDSCH(s) may be determined according to the method of determining to receive the SPS PDSCH(s) in manner MN2C.

Step two: determine to receive the multicast SPS PDSCH(s). For example, the UE may assume that there is no unicast SPS PDSCH (or there is only the multicast SPS PDSCH(s)), and determine to receive the multicast SPS PDSCH(s) according to the method of determining to receive the SPS PDSCH(s) in pseudo code-1. For another example, the reception of the multicast SPS PDSCH(s) may be determined according to the method of determining to receive the SPS PDSCH(s) in manner MN2C.

The order of step one and step two may be exchanged.

The method can reduce the complexity of the UE and/or base station implementation.

Manner MN2B

In manner MN2B, the reception of the SPS PDSCH may be determined, for example, according to the method of determining to receive the SPS PDSCH(s) in the above pseudo code-1.

For example, manner MN2B may treat the multicast SPS PDSCH as the unicast SPS PDSCH for processing regardless of the service type.

For example, if the UE does not report the first UE capability (to receive FDM-ed unicast and multicast PDSCHs), the reception of the unicast SPS PDSCH(s) and/or the multicast SPS PDSCH(s) is determined according to manner MN2B.

Manner MN2B may be performed separately or after manner MN2A.

The method can reduce the complexity of the UE and/or base station implementation.

Manner MN2C

In manner MN2C, at least one of the following manners MN3A to MN3D (MN3A, MN3B, MN3C and MN3D) may be adopted to determine to receive the unicast SPS PDSCH(s) and/or the multicast SPS PDSCH(s). For example, if the UE reports the first UE capability (capability to receive FDM-ed unicast and multicast PDSCHs) and/or at least one of the above conditions COND5 to COND17 is satisfied, at least one of the following manners MN3A to MN3D may be adopted to perform the PDSCH reception.

For example, manner MN2C may be applied without applying manner MN1A. The determination of the collision among the SPS PDSCH and the semi-statically configured uplink symbols can be reduced, and the complexity of the UE implementation can be reduced.

The method clarifies the behavior of the UE, improves the reliability of the downlink data transmission, improves the flexibility of the network scheduling, and thus improve the spectrum efficiency of the system.

Manner MN2D

In manner MN2D, a SPS PDSCH may be selected according to a predefined manner. For example, the predefined manner may be to select a SPS PDSCH with the lowest SPS configuration index (e.g., the 3GPP parameter sps-Config- Index). If another SPS PDSCH overlaps with the selected SPS PDSCH in both time domain and frequency domain, the UE does not receive the other SPS PDSCH.

Manner MN2E

In manner MN2E, it may be specified by protocols and/or configured by higher layer signaling that, the UE does not expect that a PDSCH (SPS PDSCH and/or dynamically scheduled PDSCH) overlaps with another PDSCH (SPS PDSCH and/or dynamically scheduled PDSCH) in both time domain and frequency domain. The PDSCH may be a multicast PDSCH and/or a unicast PDSCH. For example, UE does not expect that a multicast PDSCH (SPS PDSCH and/or dynamically scheduled PDSCH) overlaps with another unicast PDSCH (SPS PDSCH and/or dynamically scheduled PDSCH) in both time domain and frequency domain.

The method clarifies the behavior of the UE, improves the reliability of the downlink data transmission, improves the flexibility of the network scheduling, and thus improve the spectrum efficiency of the system.

Manner MN3A

In manner MN3A, the UE receives the unicast SPS PDSCH(s), and the UE does not receive the multicast PDSCH(s). For example, the UE may determine to receive the unicast SPS PDSCH(s) according to step one of manner MN2A, and the UE receives (decodes) the unicast SPS PDSCH(s).

The method can reduce the complexity of the UE and/or base station implementation. The reliability of the unicast PDSCH transmission can be improved.

Manner MN3B

In manner MN3B, the UE receives the multicast PDSCH(s), and the UE does not receive the unicast PDSCH(s). For example, the UE may determine to receive the multicast SPS PDSCH(s) according to step 2 of manner MN2A, and the UE receives (decodes) the determined multicast SPS PDSCH(s) for reception.

The method can reduce the complexity of the UE and/or base station implementation. The reliability of the multicast PDSCH transmission can be improved.

Manner MN3C

In manner MN3C, the UE receives the unicast SPS PDSCH(s). For example, the UE may determine to receive the unicast SPS PDSCH(s) according to step one of manner MN2A, and the UE receives the determined unicast SPS PDSCH(s) for reception. If the number of the unicast SPS PDSCH(s) determined to be received is less than (or less than or equal to) F1, the UE receives the multicast SPS PDSCH(s). For example, the UE determines to receive the multicast SPS PDSCH(s) according to step two of manner MN2A. Otherwise, if the number of the unicast SPS PDSCH(s) determined to be received is greater than or equal to (or greater than) F1, the UE does not receive the multicast SPS PDSCH(s).

In some implementations, if the number of the multicast SPS PDSCH(s) determined to be received is greater than (or greater than or equal to) F2, the UE determines to receive at most F2 multicast SPS PDSCHs from among the multicast SPS PDSCH(s) determined to be received, for example, by adopting at least one of the following manners MN4A to MN4C (MN4A, MN4B, and MN4C).

The method can reduce the complexity of the UE and/or base station implementation. The reliability of the unicast PDSCH transmission can be improved.

Manner MN4A

In manner MN4A, the at most F2 multicast SPS PDSCHs are determined (e.g., identified) from among the determined multicast SPS PDSCH(s) for reception, where indexes of the F2 multicast SPS PDSCHs are the first F2 SPS configuration indexes (e.g., in an ascending order) from among SPS configuration indexes of the determined multicast SPS PDSCH(s) for reception, and the at most F2 multicast SPS PDSCHs are received.

The method can reduce the complexity of the UE and/or base station implementation. The reliability of the multicast PDSCH transmission can be improved.

Manner MN4B

In manner MN4B, the at most F2 multicast SPS PDSCHs that do not overlap with the unicast SPS PDSCH(s) in both time domain and frequency domain are received.

The method can reduce the complexity of the UE and/or base station implementation. The reliability of the multicast PDSCH transmission can be improved.

Manner MN4C

In manner MN4C, the at most F2 multicast SPS PDSCHs with lower SPS configuration indexes of multicast SPS PDSCHs that do not overlap with the unicast SPS PDSCH in both time domain and frequency domain are received (for example, the SPS PDSCHs are sorted in an ascending order of SPS configuration indexes, and at most the first F2 SPS PDSCHs are selected therefrom). In an implementation of manner MN4C, one or more multicast SPS PDSCHs that do not overlap with the unicast SPS PDSCH in both time domain and frequency domain are determined (e.g., identified) from the determined multicast SPS PDSCH(s) for reception, and the at most F2 multicast SPS PDSCHs are determined (e.g., identified) from the one or more multicast SPS PDSCHs that do not overlap with the unicast SPS PDSCH in both time domain and frequency domain, where indexes of the F2 multicast SPS PDSCHs are the first F2 SPS configuration indexes (e.g., in an ascending order) from SPS configuration indexes of one or more multicast SPS PDSCHs that do not overlap with the unicast SPS PDSCH in both time domain and frequency domain. Then, the at most F2 multicast SPS PDSCHs are received.

The method can reduce the complexity of the UE and/or base station implementation. The reliability of the multicast PDSCH transmission can be improved.

Manner MN3D

In manner MN3D, the UE receives the multicast SPS PDSCH(s). For example, the UE may determine to receive the multicast SPS PDSCH(s) according to step two of manner MN2A, and the UE receives the determined multicast SPS PDSCH for reception. If the number of the multicast SPS PDSCH(s) determined to be received is less than (or less than or equal to) F2, the UE receives the unicast SPS PDSCH(s). For example, the UE may determine to receive the unicast SPS PDSCH(s) according to step one of manner MN2A. Otherwise, if the number of the multicast SPS PDSCH(s) determined to be received is greater than or equal to (or greater than) F2, the UE does not receive the unicast SPS PDSCH(s).

In some implementations, if the number of unicast SPS PDSCH(s) determined to be received is greater than (or greater than or equal to) F1, the UE determines to receive at most F1 unicast SPS PDSCH(s) from among the unicast SPS PDSCHs determined to be received, for example, by adopting at least one of the following manners MN5A to MN5C (manner MN5A, manner MN5B, and manner MN5C).

The method can reduce the complexity of the UE and/or base station implementation. The reliability of the multicast PDSCH transmission can be improved.

Manner MN5A

In manner MN5A, the at most F1 unicast SPS PDSCHs with lower SPS configuration indexes are received (for example, the unicast SPS PDSCHs are sorted in an ascending order of SPS configuration indexes, and at most the first F1 unicast SPS PDSCHs are selected therefrom). In an implementations of manner MN5A, the at most F1 unicast SPS PDSCHs are determined (e.g., identified) from the determined unicast SPS PDSCH(s) for reception, where indexes of the F1 unicast SPS PDSCHs are the first F1 SPS configuration indexes (e.g., in an ascending order) from SPS configuration indexes of the determined unicast SPS PDSCH(s) for reception, and the at most F1 unicast SPS PDSCHs are received.

The method can reduce the complexity of the UE and/or base station implementation. The reliability of the unicast PDSCH transmission can be improved.

Manner MN5B

In manner MN5B, the at most F1 unicast SPS PDSCHs with lower SPS configuration indexes of unicast SPS PDSCHs that do not overlap with the multicast SPS PDSCH in both time domain and frequency domain are received (for example, the unicast SPS PDSCHs are sorted in an ascending order of SPS configuration indexes, and at most the first F1 unicast SPS PDSCH are selected therefrom). In an implementation of manner MN5B, the at most F1 unicast SPS PDSCHs that do not overlap with the multicast SPS PDSCH in both time domain and frequency domain are determined (e.g., identified), and the at most F1 unicast SPS PDSCHs that do not overlap with the multicast SPS PDSCH in both time domain and frequency domain are received.

The method can reduce the complexity of the UE and/or base station implementation. The reliability of the unicast PDSCH transmission can be improved.

Manner MN5C

In manner MN5C, the at most F1 unicast SPS PDSCHs with lowest SPS configuration indexes of unicast SPS PDSCHs that do not overlap with the multicast SPS PDSCH in both time domain and frequency domain are received. (For example, the SPS PDSCHs are sorted in an ascending order of SPS configuration indexes, and at most the first F1 SPS PDSCHs are selected therefrom). In an implementation of manner MN5C, one or more unicast SPS PDSCHs that do not overlap with the multicast SPS PDSCH in both time domain and frequency domain are determined (e.g., identified) from the determined unicast SPS PDSCH(s) for reception, and the at most F1 unicast SPS PDSCHs are determined (e.g., identified) from the one or more unicast SPS PDSCHs that do not overlap with the multicast SPS PDSCH in both time domain and frequency domain, where indexes of the F1 unicast SPS PDSCHs are the first F1 SPS configuration indexes (e.g., in an ascending order) from the SPS configuration indexes of one or more unicast SPS PDSCHs that do not overlap with the multicast SPS PDSCH in both time domain and frequency domain. Then, the at most F1 unicast SPS PDSCHs are received.

The method can reduce the complexity of the UE and/or base station implementation. The reliability of the unicast PDSCH transmission can be improved.

Manners NM3A to NM3D clarify the behavior of the UE, improve the reliability of the downlink data transmission, improve the flexibility of the network scheduling, and thus improve the spectrum efficiency of the system.

In certain cases, if the UE supports receiving FDM-ed unicast and multicast PDSCHs in a slot of a carrier, the UE first resolves collision among unicast SPS PDSCHs and collision among multicast SPS PDSCHs respectively, and determines at most one unicast SPS PDSCH for reception (e.g., unicast SPS PDSCH with the lowest index) and/or at most one multicast SPS PDSCH reception (e.g., multicast SPS PDSCH with the lowest index). If the determined unicast SPS PDSCH overlaps with the determined multicast SPS PDSCH in both time domain and frequency domain (or in frequency domain), the UE receives the unicast SPS PDSCH, and does not receive the multicast SPS PDSCH. Or, the UE receives the SPS PDSCH with the smallest index.

After resolving the collision among the unicast SPS PDSCHs and the collision among the multicast SPS PDSCHs, the UE resolves collision among dynamically scheduled PDSCH(s) (e.g., PDSCH scheduled by a PDCCH/DCI format) and SPS PDSCH(s).

If, in a serving cell, a PDSCH scheduled by a PDCCH overlaps with a SPS PDSCH in both time domain and frequency domain, and an interval between an end position (symbol) of the PDCCH and a starting position (symbol) of the SPS PDSCH is greater than a predefined time T (for example, T may be 14 OFDM symbols), the UE receives the PDSCH scheduled by the PDCCH, and does not receive the SPS PDSCH.

If the collision among the unicast SPS PDSCHs and the collision among the multicast SPS PDSCHs are resolved, the UE would (i.e., expects to) receive the unicast SPS PDSCH and the multicast SPS PDSCH (e.g., at least one unicast SPS PDSCH and at least one multicast SPS PDSCH) in a slot on a serving cell. For the same cast type (for example, the cast type may be unicast or multicast), if an interval between an end position (symbol) of a PDCCH scheduling a PDSCH and a starting position (symbol) of a SPS PDSCH is greater than a predefined time T (for example, T may be 14 OFDM symbols), the UE receives the PDSCH scheduled by the PDCCH, and does not receive the SPS PDSCH.

The method can preferentially ensure the transmission of the dynamically scheduled PDSCH and improve the flexibility of the dynamic scheduling.

In some implementations, it may be specified by protocols and/or configured by higher layer signaling that, the UE may feed back HARQ-ACK information for a SPS PDSCH for reception (e.g., final or actual reception) determined by the method of other embodiments of the disclosure. For example, for a scenario with only SPS PDSCHs, the UE transmits HARQ-ACK information only for a SPS PDSCH determined to be received, and a SPS PDSCH that is not to be received (not expected to be received) has no corresponding bits in a HARQ-ACK codebook. The method can reduce the number of bits of HARQ-ACK, improve the reliability of the uplink transmission and improve the spectrum efficiency of the system. For example, for a scenario with dynamically scheduled PDSCHs, the UE may feed back NACK for a SPS PDSCH that is not to be received (not expected to be received). At this time, the base station knows that the UE will feed back the NACK. When RM (Reed Muller) coding is adopted, the NACK known by the base station may not be used to calculate the transmit power, which can reduce the transmit power of the UE.

In the embodiments, the UE does not support receiving an FDM-ed unicast and multicast PDSCH in a slot of a carrier or the UE does not report the UE capability 1 may be replaced by a parameter indicating that FDM-ed unicast and multicast PDSCHs may be received is not configured by higher layer signaling.

Also in the embodiments, the UE supports receiving an FDM-ed unicast and multicast PDSCH in a slot of a carrier or the UE reports the UE capability 1 may be replaced by a parameter indicating that FDM-ed unicast PDSCH and multicast PDSCHs may be received is configured by higher layer signaling.

FIG. 8 is a flowchart of a method performed by a terminal (e.g., UE) according to an embodiment.

Referring to FIG. 8, in operation S810, at least one PDSCH is received from one or more scheduled PDSCHs, with each of the one or more PDSCHs including a unicast PDSCH including a dynamically scheduled unicast PDSCH and/or a unicast semi-persistent scheduling (SPS) PDSCH, and/or a multicast PDSCH including a dynamically scheduled multicast PDSCH and/or a multicast SPS PDSCH.

For example, the scheduled PDSCH may be a PDSCH scheduled by DCI, and/or a PDSCH (SPS PDSCH) that is configured to be received by higher layer signaling.

Next, in operation S820, HARQ-ACK information is fed back (for example, transmitted or reported) for the at least one received PDSCH.

For example, the method may include the methods or operations that may be performed by the terminal (e.g., UE) in various embodiments, as described above.

In certain implementations, the receiving of the at least one PDSCH from the one or more scheduled PDSCHs includes receiving the at least one PDSCH based on a predefined condition.

In certain implementations, the predefined condition includes one or more of the following:
  a first capability (e.g., UE capability 1 or first UE capability described in the embodiments) and/or a second capability (e.g., UE capability 2 or the second UE capability described in the embodiments) and/or a third capability (e.g., UE capability 3 or the third UE capability described in the embodiments) and/or a fourth capability (e.g., UE capability 4 or the fourth UE capability described in the embodiments) and/or a fifth capability (e.g., UE capability 5 or the fifth UE capability described in the embodiments), where the first capability indicates a maximum number of unicast PDSCHs supported and/or a maximum number of multicast PDSCHs supported when the FDM-based unicast and multicast PDSCHs are received, the second capability indicates a maximum number of unicast PDSCHs supported, a maximum number of multicast PDSCHs supported and/or a maximum number of PDSCHs supported when the unicast PDSCHs and the multicast PDSCHs are received based on time division multiplexing, the third UE capability indicates that receiving of the multicast PDSCH is supported, the fourth UE capability indicates that receiving of the unicast PDSCH when the unicast PDSCH collides with the multicast PDSCH is supported, and the fifth UE capability indicates that receiving of the multicast PDSCH when the unicast PDSCH collides with the multicast PDSCH is supported;
  one or more of the first capability, the second capability, the third capability, the fourth capability or the fifth capability having not reported by the terminal;
  a comparison result of a number of scheduled unicast SPS PDSCHs with a first value (e.g., F1 described in the embodiments);
  a comparison result of a number of scheduled multicast SPS PDSCHs with a second value (F2 described in the embodiments);
  whether at least one unicast SPS PDSCH of the scheduled unicast SPS PDSCHs overlaps with at least one multicast SPS PDSCH of the scheduled multicast SPS PDSCHs in time domain and/or frequency domain.

In certain implementations, each of the first value or the second value is determined based on the first capability or the second capability reported by the terminal.

In certain implementations, the receiving of the at least one PDSCH from the one or more scheduled PDSCHs includes receiving one or more unicast SPS PDSCHs and/or one or more multicast SPS PDSCHs from the one or more scheduled PDSCHs; and/or receiving one or more unicast PDSCHs and/or one or more multicast PDSCHs from the one or more scheduled PDSCHs.

In certain implementations, the receiving of the one or more unicast SPS PDSCHs and/or the one or more multicast SPS PDSCHs includes at least one of:
  receiving the one or more unicast SPS PDSCHs, and/or receiving the one or more multicast SPS PDSCHs;
  receiving the one or more unicast SPS PDSCHs, and/or not receiving the multicast PDSCHs;
  receiving the one or more multicast PDSCHs, and/or not receiving the unicast SPS PDSCHs;
  receiving the one or more unicast SPS PDSCHs, and determining whether to receive the multicast PDSCHs based on a number of the one or more unicast SPS PDSCHs and/or a number of the one or more multicast PDSCHs;
  receiving the one or more multicast PDSCHs, and determining whether to receive the unicast SPS PDSCHs based on a number of the one or more multicast SPS PDSCHs and/or the number of the one or more unicast SPS PDSCHs; or
  determining at least one PDSCH for reception without considering a type of the scheduled PDSCH (e.g., traffic type or cast type), and the type of the scheduled PDSCH includes one of unicast type or multicast type.

In certain implementations, the receiving of the one or more unicast SPS PDSCHs includes receiving a unicast SPS PDSCH with a lowest SPS configuration index.

In certain implementations, the receiving of the one or more multicast SPS PDSCHs includes receiving a multicast SPS PDSCH with a lowest SPS configuration index.

In certain implementations, the determining of whether to receive the one or more multicast PDSCHs based on the number of the one or more unicast SPS PDSCHs and/or the number of the one or more multicast PDSCHs includes:
  in case that the number of the one or more unicast SPS PDSCHs is less than (or less than or equal to) a first value, receiving the one or more unicast SPS PDSCHs, and receiving the one or more multicast SPS PDSCHs; and/or
  in case that the number of the one or more unicast SPS PDSCHs is greater than (or greater than or equal to) the first value, receiving the one or more unicast SPS PDSCHs, and not receiving the multicast SPS PDSCHs; and/or
  in case that the number of the one or more multicast PDSCHs is greater than (or greater than or equal to) a second value, receiving the one or more unicast SPS PDSCHs, and receiving at most P multicast SPS PDSCHs of the one or more multicast SPS PDSCHs, wherein a value of P is equal to the second value.

In certain implementations, SPS configuration indexes of the P multicast SPS PDSCHs are the first P SPS configuration indexes from among SPS configuration indexes of the one or more multicast SPS PDSCHs.

In certain implementations, each of the P multicast SPS PDSCHs does not overlap with each of the one or more unicast SPS PDSCHs in both time domain and frequency domain.

In certain implementations, the SPS configuration indexes of the P multicast SPS PDSCHs are the first P SPS configuration indexes from among SPS configuration indexes of multicast SPS PDSCHs of the one or more multicast SPS PDSCHs that do not overlap with each of the one or more unicast SPS PDSCHs in both time domain and frequency domain.

In certain implementations, the determining of whether to receive the unicast SPS PDSCHs based on the number of the one or more multicast SPS PDSCHs and/or the number of the one or more unicast SPS PDSCHs includes:
  in case that the number of the one or more multicast SPS PDSCHs is less than (or less than or equal to) a second value, receiving the one or more multicast SPS PDSCHs, and receiving the one or more unicast SPS PDSCHs; and/or
  receiving the one or more multicast SPS PDSCHs, and not receiving the unicast SPS PDSCHs, in case that the number of the one or more multicast SPS PDSCHs is greater than (or greater than or equal to) the second value; and/or
  in case that a number of the one or more unicast PDSCHs is greater than (or greater than or equal to) a first value, receiving the one or more multicast SPS PDSCHs, and receiving at most Q unicast SPS PDSCHs of the one or more unicast SPS PDSCHs, wherein a value of Q is equal to the first value.

In certain implementations, SPS configuration indexes of the Q unicast SPS PDSCHs are the first Q SPS configuration indexes from among SPS configuration indexes of the one or more unicast SPS PDSCHs.

In certain implementations, each of the Q unicast SPS PDSCHs does not overlap with each of the one or more multicast SPS PDSCHs in both time domain and frequency domain.

In certain implementations, the SPS configuration indexes of the Q unicast SPS PDSCHs are the first Q indexes from among SPS configuration indexes of unicast SPS PDSCHs of the one or more unicast SPS PDSCHs that do not overlap with each of the one or more multicast SPS PDSCHs in both time domain and frequency domain.

In certain implementations, the receiving of the at least one PDSCH from the one or more scheduled PDSCHs includes receiving one or more unicast PDSCHs from the one or more scheduled PDSCHs, and/or receiving one or more multicast PDSCHs from the one or more scheduled PDSCHs.

In certain implementations, the receiving of the at least one PDSCH from the one or more scheduled PDSCHs includes receiving a PDSCH with a first priority from the one or more scheduled PDSCH; and/or receiving a PDSCH with a second priority from the one or more scheduled PDSCH, wherein the second priority is lower than the first priority.

In certain implementations, the terminal does not expect that the reception of the unicast PDSCHs and/or the multicast PDSCHs in a time unit (e.g., slot) goes beyond a capability of the terminal.

Figure 9:
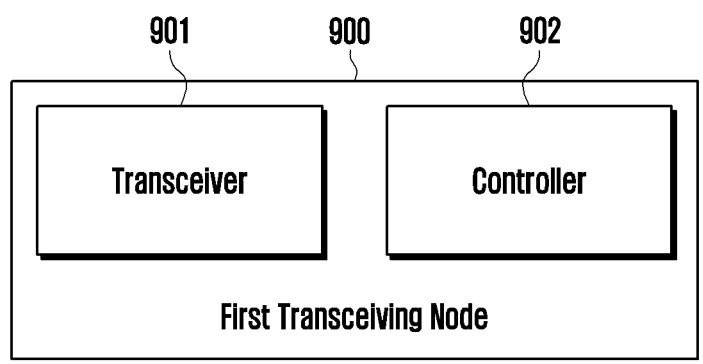
FIG. 9 illustrates a first transceiving node according to an embodiment.

FIG. 9 illustrates a first transceiving node 1000 according to an embodiment.

Referring to FIG. 9, a first transceiving node 900 includes a transceiver 901 and a controller 902.

The transceiver 901 may be configured to transmit first data and/or first control signaling to a second transceiving node and receive second data and/or second control signaling from the second transceiving node in a time unit.

The controller 902 may be an application specific integrated circuit or at least one processor. The controller 902 may be configured to control the overall operation of the first transceiving node, including controlling the transceiver 901 to transmit the first data and/or the first control signaling to the second transceiving node and receive the second data and/or the second control signaling from the second transceiving node in a time unit.

The controller 902 may be configured to perform one or more of operations in the methods of various embodiments described above.

In the following description, and without limitation, a base station is taken as an example of the first transceiving node, a UE is taken as an example of the second transceiving node. Downlink data and/or downlink control signaling are used to illustrate the first data and/or the first control signaling. A HARQ-ACK codebook may be included in the second control signaling, and uplink control signaling is used to illustrate the second control signaling.

Figure 10:
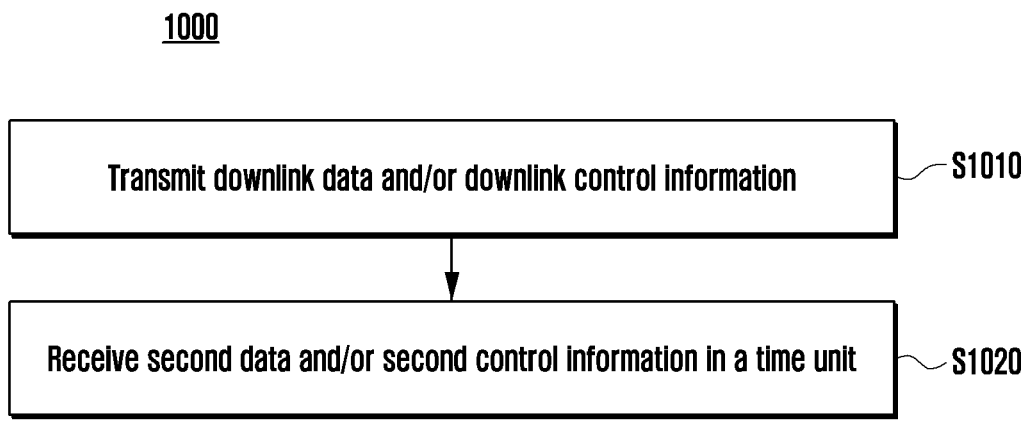
FIG. 10 is a flowchart illustrating a method performed by a base station according to an embodiment.

FIG. 10 is a flowchart illustrating a method 1000 performed by a base station according to an embodiment.

Referring to FIG. 10, in step S1010, the base station transmits downlink data and/or downlink control information.

In step S1020, the base station receives second data and/or second control information from a UE in a time unit.

For example, the method 1000 may include one or more of the operations performed by the base station, as described in in the various embodiments herein.

According to an embodiment, a base station in a wireless communication system is provided, with the base station including a transceiver configured to transmit and receive signals, and a controller coupled to the transceiver and configured to perform the above-described operations.

According to another embodiment, a computer-readable storage medium having one or more computer programs stored thereon is provided, with the one or more computer programs, when executed by one or more processors, implementing the above-described operations.

Those skilled in the art will understand that the above illustrative embodiments are described herein and are not intended to be limiting. It should be understood that any two or more of the embodiments disclosed herein may be combined in any combination. Further, other embodiments may be utilized and other changes may be made without departing from the spirit and scope of the subject matter presented herein. It will be readily understood that aspects of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a digital signal processor (DSP), an application specific integrated circuit (ASIC), a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described herein may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:
   identifying that a unicast physical downlink shared channel (PDSCH) and a multicast PDSCH overlap in a slot;
   identifying that a predefined condition is satisfied;
   based on the predefined condition being satisfied, determining whether to receiver at least one PDSCH from a plurality of scheduled PDSCHs including the unicast PDSCH and the multicast PDSCH;
   based on determining to receive the at least one PDSCH, receiving the at least one PDSCH; and
   transmitting hybrid automatic repeat request-acknowledgement (HARQ-ACK) information for the at least one received PDSCH,
   wherein the predefined condition includes a first condition being satisfied when a number of scheduled multicast PDSCHs in a slot is greater than a first value, and
   wherein the first value is determined based on at least one of a first capability or a second capability reported by the terminal.

2. The method of claim 1, further comprising:
   transmitting a capability report related to a PDSCH reception,
   wherein the capability report includes at least one of the first capability, the second capability, a third capability, a fourth capability or a fifth capability,
   wherein the first capability indicates at least one of a maximum number of unicast PDSCHs supported or a maximum number of multicast PDSCHs supported in case that frequency division multiplexing based unicast and multicast PDSCHs are received,
   wherein the second capability indicates at least one of a maximum number of unicast PDSCHs supported, a maximum number of multicast PDSCHs supported or a maximum number of PDSCHs supported in case that time division multiplexing based unicast and multicast PDSCHs are received,
   wherein the third capability indicates that receiving of the multicast PDSCH is supported,
   wherein the fourth capability indicates that receiving of the unicast PDSCH when the unicast PDSCH collides with the multicast PDSCH is supported, and
   wherein the fifth capability indicates that receiving of the multicast PDSCH when the unicast PDSCH collides with the multicast PDSCH is supported.

3. The method of claim 1,
   wherein the predefined condition further includes:
   a second condition being satisfied when a number of scheduled unicast PDSCHs in a slot is greater than a second value, and
   wherein the second value is determined based on at least one of the first capability or the second capability reported by the terminal.

4. The method of claim 1,
   wherein the unicast PDSCH includes a dynamically scheduled unicast PDSCH or a unicast semi-persistent scheduling (SPS) PDSCH,
   wherein the multicast PDSCH includes a dynamically scheduled multicast PDSCH or a multicast SPS PDSCH, and
   wherein determining whether to receive the at least one PDSCH comprises:
      determining to receive one or more unicast SPS PDSCHs and determining whether to receive one or more multicast SPS PDSCHs based on at least one of a number of the one or more unicast SPS PDSCHs determined to be received or a number of the one or more multicast SPS PDSCHs; or
      determining to receive the one or more multicast SPS PDSCHs and determining whether to receive the one or more unicast SPS PDSCHs based on at least one of a number of the one or more multicast SPS PDSCHs determined to be received or the number of the one or more unicast SPS PDSCHs.

5. The method of claim 1, wherein receiving the at least one PDSCH comprises:
   receiving a unicast semi-persistent scheduling (SPS) PDSCH with a lowest SPS configuration index; and
   receiving a multicast SPS PDSCH with a lowest SPS configuration index.

6. The method of claim 4, wherein determining to receive one or more unicast SPS PDSCHs and determining whether to receive the one or more multicast SPS PDSCHs based on at least one of the number of the one or more unicast SPS PDSCHs determined to be received or the number of the one or more multicast SPS PDSCHs comprises at least one of:
in case that the number of the one or more unicast SPS PDSCHs determined to be received is less than the first value, determining to receive the one or more unicast SPS PDSCHs and determining to receive the one or more multicast SPS PDSCHs; and
in case that the number of the one or more unicast SPS PDSCHs determined to be received is greater than the first value, determining to receive the one or more unicast SPS PDSCHs and determining not to receive the one or more multicast SPS PDSCHs.

7. The method of claim 6, wherein:
in case that the number of the one or more multicast SPS PDSCHs is greater than or equal to the second value, determining to receive the one or more multicast SPS PDSCHs comprises determining to receive at most P multicast SPS PDSCHs of the one or more multicast SPS PDSCHs, a value of P being equal to the second value,
SPS configuration indexes of the P multicast SPS PDSCHs are first P SPS configuration indexes from among SPS configuration indexes of the one or more multicast SPS PDSCHs; and
each of the P multicast SPS PDSCHs does not overlap with each of the one or more unicast SPS PDSCHs in both time domain and frequency domain.

8. The method of claim 4, wherein determining to receive the one or more multicast SPS PDSCHs and determining whether to receive the one or more unicast SPS PDSCHs based on the at least one of the number of the one or more multicast SPS PDSCHs determined to be received or the number of the one or more unicast SPS PDSCHs comprises:
in case that the number of the one or more multicast SPS PDSCHs determined to be received is less than the second value, determining to receive the one or more multicast SPS PDSCHs and determining to receive the one or more unicast SPS PDSCHs; and
in case that the number of the one or more multicast SPS PDSCHs determined to be received is greater than the second value, determining to receive the one or more multicast SPS PDSCHs and determining not to receive the one or more unicast SPS PDSCHs.

9. The method of claim 8, wherein:
in case that the number of the one or more unicast SPS PDSCHs is greater than or equal to the first value, determining to receive the one or more unicast SPS PDSCHs comprises determining to receive at most Q unicast SPS PDSCHs of the one or more unicast SPS PDSCHs, a value of Q being equal to the first value,
SPS configuration indexes of the Q unicast SPS PDSCHs are first Q SPS configuration indexes from among SPS configuration indexes of the one or more unicast SPS PDSCHs; and
each of the Q unicast SPS PDSCHs does not overlap with each of the one or more multicast SPS PDSCHs in both time domain and frequency domain.

10. The method of claim 1, wherein receiving the at least one PDSCH from the plurality of scheduled PDSCHs comprises:
at least one of receiving a PDSCH with a first priority from the plurality of scheduled PDSCHs, and receiving a PDSCH with a second priority from the plurality of scheduled PDSCHs, wherein the second priority is lower than the first priority; and
wherein, for receiving PDSCHs by the terminal, at least one of receiving one or more unicast PDSCHs and receiving one or more multicast PDSCHs is not expected in a time unit beyond a capability of the terminal.

11. A terminal in a wireless communication system, the terminal comprising:
a transceiver configured to transmit and receive signals; and
a controller coupled to the transceiver and configured to:
identify that a unicast physical downlink shared channel (PDSCH) and a multicast PDSCH overlap in a slot,
identify that a predefined condition is satisfied,
based on the predefined condition being satisfied, determine whether to
receive at least one PDSCH from a plurality of scheduled PDSCHs including the unicast PDSCH and the multicast PDSCH,
based on determining to receive the at least one PDSCH, receive the at least one PDSCH, and
transmit hybrid automatic repeat request-acknowledgement (HARQ-ACK) information for the at least one received PDSCH,
wherein the predefined condition includes a first condition being satisfied when a number of scheduled multicast PDSCHs in a slot is greater than a first value, and
wherein the first value is determined based on at least one of a first capability or a second capability reported by the terminal.

12. The terminal of claim 11, wherein the controller is further configured to transmit a capability report related to a PDSCH reception,
wherein the capability report includes at least one of the first capability, the second capability, a third capability, a fourth capability or a fifth capability,
wherein the first capability indicates at least one of a maximum number of unicast PDSCHs supported and a maximum number of multicast PDSCHs supported when frequency division multiplexing based unicast and multicast PDSCHs are received,
wherein the second capability indicates at least one of a maximum number of unicast PDSCHs supported, a maximum number of multicast PDSCHs supported and a maximum number of PDSCHs supported when time division multiplexing based unicast and multicast PDSCHs are received,
wherein the third capability indicates that receiving of the multicast PDSCH is supported,
wherein the fourth capability indicates that receiving of the unicast PDSCH when the unicast PDSCH collides with the multicast PDSCH is supported, and
wherein the fifth capability indicates that receiving of the multicast PDSCH when the unicast PDSCH collides with the multicast PDSCH is supported.

* * * * *